US012707355B2

(12) United States Patent
Hu et al.

(10) Patent No.: US 12,707,355 B2
(45) Date of Patent: Aug. 11, 2026

(54) METHOD AND APPARATUS FOR MEASURING QUALITY OF EXPERIENCE QOE

(71) Applicant: HUAWEI TECHNOLOGIES CO., LTD., Shenzhen (CN)

(72) Inventors: Xingxing Hu, Shanghai (CN); Tingting Geng, Shanghai (CN); Jun Chen, Shanghai (CN); Xudong Yang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 322 days.

(21) Appl. No.: 18/352,057

(22) Filed: Jul. 13, 2023

(65) Prior Publication Data

US 2023/0362763 A1 Nov. 9, 2023

Related U.S. Application Data

(63) Continuation of application No. PCT/CN2021/071940, filed on Jan. 14, 2021.

(51) Int. Cl.
*H04W 36/00* (2009.01)
*H04W 24/08* (2009.01)
*H04W 24/10* (2009.01)

(52) U.S. Cl.
CPC ....... *H04W 36/0085* (2018.08); *H04W 24/08* (2013.01); *H04W 24/10* (2013.01)

(58) Field of Classification Search
CPC ................................................ H04W 36/0085
See application file for complete search history.

(56) References Cited

U.S. PATENT DOCUMENTS

2017/0302539 A1 10/2017 Park et al.
2020/0092762 A1* 3/2020 Shi .................... H04W 36/0033
(Continued)

FOREIGN PATENT DOCUMENTS

CN 110301151 A 10/2019
WO 2019030737 A1 2/2019

OTHER PUBLICATIONS

Samsung "Discussion on NR QoE solutions," 3GPP TSG-RAN3 Meeting #110-e, Electronic meeting, R3-206036, XP052399017, Total 6 pages, 3rd Generation Partnership Project, Valbonne, France (Nov. 2-12, 2020).

(Continued)

*Primary Examiner* — Abdeltif Ajid
(74) *Attorney, Agent, or Firm* — Leydig, Voit & Mayer, Ltd.

(57) ABSTRACT

A communication system and apparatus for measuring quality of experience (QoE) are provided. The communication system includes a source access network device and a target access network device, wherein the source access network device is configured to determine that a terminal device is handed over from the source access network device to the target access network device, and the target access network device is configured to receive first indication information from the source network device, where the first indication information indicates a quality of experience (QoE) measurement that has been started by the terminal device. When load of an access network device is high, the QoE measurement executed by the terminal device is adjusted to reduce the load of the access network device and improve communication efficiency.

16 Claims, 11 Drawing Sheets

(56) References Cited

U.S. PATENT DOCUMENTS

2020/0413301 A1* 12/2020 Shi ........................ H04W 36/08
2022/0046503 A1* 2/2022 Kumar .................. H04W 28/24
2023/0292166 A1* 9/2023 Centonza .............. H04W 24/08
2024/0031832 A1* 1/2024 Parichehrehteroujeni ................... H04W 24/08

OTHER PUBLICATIONS

Huawei et al., "Discussions on potential RAN3 impacts about the QoE measurement configuration, reporting and releasing under SA, NSA and MR-DC operation," 3GPP TSG-RAN WG3 Meeting #110-e, R3-206734, XP052399752, Total 7 pages, 3rd Generation Partnership Project, Valbonne, France (Nov. 2-12, 2020).
Samsung "(pCR TR 38.890) NR QoE solutions, procedures and interface impacts," 3GPP TSG-RAN3 Meeting #110-e, Electronic meeting, R3-206037, XP051945627, Total 13 pages, 3rd Generation Partnership Project, Valbonne, France (Nov. 2-12, 2020).
Ericsson "Status Report RAN WG3," 3GPP TSG RAN #90-e, RP-202795, XP051965930, Total 31 pages, 3rd Generation Partnership Project, Valbonne, France (Dec. 7-11, 2020).
China Unicom et al., "Discussion on requirements and mechanisms for per slice QoE measurement," 3GPP TSG-RAN WG3 Meeting #110e, R3-206493, Total 3 pages (Nov. 2-12, 2020).
Qualcomm Inc.,"Interworking with LTE QoE," 3GPP TSG-RAN WG3 Meeting #110e, R3-206175, E-Meeting, Total 2 pages (Nov. 2-12, 2020).
ZTE, "Further consideration on study of NR QoE," 3GPP TSG-RAN WG3 #110-e, R3-206713, total 7 pages (Nov. 2-12, 2020).
Samsung, "(pCR TR 38.890) NR QoE solutions, procedures and interface impacts," 3GPP TSG-RAN3 Meeting #110-e, Electronic meeting, R3-206037, Total 13 pages, 3rd Generation Partnership Project, Valbonne, France (Nov. 2-12, 2020).
Ericsson, "Start and Stop of QoE Measurements," 3GPP TSG RAN WG2 #99bis, R2-1710506, pp. 1-4, 3rd Generation Partnership Project, Valbonne, France (Oct. 9-13, 2017).
"3rd Generation Partnership Project; Technical Specification Group Services and System Aspects; IP Multimedia Subsystem (IMS); Multimedia Telephony; Media handling and interaction (Release 16)," 3GPP TS 26.114 V16.8.0, pp. 1-445, 3rd Generation Partnership Project, Valbonne, France (Dec. 2020).
"3rd Generation Partnership Project; Technical Specification Group Services and System Aspects; Transparent end-to-end Packet-switched Streaming Service (PSS); Progressive Download and Dynamic Adaptive Streaming over http (3GP-DASH) (Release 16)," 3GPP TS 26.247 V16.4.1, pp. 1-140, 3rd Generation Partnership Project, Valbonne, France (Oct. 2020).
"3rd Generation Partnership Project; Technical Specification Group Radio Access Network; Evolved Universal Terrestrial Radio Access Network (E-UTRAN); S1 Application Protocol (S1AP) (Release 16)," 3GPP TS 36.413 V16.4.0, pp. 1-423, 3rd Generation Partnership Project, Valbonne, France (Jan. 2021).
"3rd Generation Partnership Project; Technical Specification Group Radio Access Network; NR; NR and NG-RAN Overall Description; Stage 2 (Release 16)," 3GPP TS 38.300 V16.4.0, pp. 1-149, 3rd Generation Partnership Project, Valbonne, France (Dec. 2020).
"3rd Generation Partnership Project; Technical Specification Group Radio Access Network; NR; Radio Resource Control (RRC) protocol specification (Release 15)," 3GPP TS 38.331 V15.12.0, pp. 1-541, 3rd Generation Partnership Project, Valbonne, France (Dec. 2020).
"3rd Generation Partnership Project; Technical Specification Group Radio Access Network; NG-RAN; Xn application protocol (XnAP) (Release 16)," 3GPP TS 38.423 V16.4.0, pp. 1-457, 3rd Generation Partnership Project, Valbonne, France (Jan. 2021).
"Reply LS on Attributes for QoE measurement collection," 3GPP TSG RAN WG2#105, R2-1900096, Athens, Greece, Total 2 pages, 3rd Generation Partnership Project, Valbonne, France (Feb. 25-Mar. 1, 2019).
"Digital cellular telecommunications system (Phase 2+) (GSM); Universal Mobile Telecommunications System (UMTS); LTE; Telecommunication management; Subscriber and equipment trace; Trace control and configuration management (3GPP TS 32.422 version 15.2.0 Release 15)," ETSI TS 132 422 V15.2.0, total 185 pages (Jun. 2019).

* cited by examiner

METHOD AND APPARATUS FOR MEASURING QUALITY OF EXPERIENCE QOE

CROSS-REFERENCE TO RELATED APPLICATIONS

This application is a continuation of International Patent Application No. PCT/CN2021/071940, filed on Jan. 14, 2021, the disclosure of which is hereby incorporated by reference in its entirety.

TECHNICAL FIELD

This application relates to the field of communication technologies, and in particular, to a method and apparatus for measuring quality of experience (QoE).

BACKGROUND

With rapid development of a network, a bandwidth and speed of the network increase geometrically. For some streaming services or voice services, signal quality cannot reflect user experience when users use these services. Quality of experience (QoE) is a key factor that determines user loyalty and market share in communication operation. Therefore, to attract more customers, operators need to determine user experience when the users use these services, to better optimize the network and improve user experience.

SUMMARY

Embodiments of this application disclose a method and apparatus for measuring quality of experience QoE, so that when load of an access network device is high, a QoE measurement executed by a terminal device can be adjusted, to reduce the load of the access network device and improve communication efficiency.

A first aspect of embodiments of this application discloses a method for measuring quality of experience QoE. The method includes: A target access network device determines that a terminal device is handed over from a source access network device to the target access network device. The target access network device obtains first indication information, where the first indication information indicates a quality of experience QoE measurement that has been started by the terminal device.

In the foregoing method, in the terminal device handover scenario, load of the target access network device increases because of excessively frequent QoE measurements. Therefore, when the load of the target access network device is high, the target access network device obtains the first indication information to determine the QoE measurement that has been started by the terminal device, and indicates the terminal device to pause or cancel at least one QoE measurement other than the QoE measurement that has been started, to reduce the load of the target access network device and improve communication efficiency.

In a possible implementation, the method further includes: The target access network device sends a first message to the terminal device based on the first indication information, where the first message indicates the terminal device to pause or cancel at least one QoE measurement other than the QoE measurement that has been started.

In another possible implementation, that the target access network device obtains first indication information includes: The target access network device receives the first indication information from the source access network device.

In still another possible implementation, that the target access network device obtains first indication information includes: The target access network device receives the first indication information from the terminal device.

In still another possible implementation, the first indication information includes at least one of the following: a service type corresponding to the QoE measurement that has been started by the terminal device, identification information of a network slice corresponding to the QoE measurement that has been started, and a session recording indication of the terminal device.

In still another possible implementation, when the first indication information includes the session recording indication, the method further includes: The target access network device obtains second indication information, where the second indication information indicates that a QoE measurement for a session corresponding to the session recording indication is in a started and executing state, a stopped state, or a completed state.

In the foregoing method, the target access network device obtains the second indication information, to determine a status of the QoE measurement for the session corresponding to the session recording indication, and to more accurately determine a QoE measurement that has been started currently, to make a better decision and improve communication efficiency.

In still another possible implementation, when the first indication information includes the session recording indication, the method further includes: The target access network device obtains third indication information or fourth indication information, where the third indication information indicates that a QoE measurement for a session corresponding to the session recording indication is in a started and executing state, and the fourth indication information indicates that a QoE measurement for a session corresponding to the session recording indication is in a stopped state or a completed state.

In the foregoing method, the target access network device obtains the third indication information or the fourth indication information, to determine a status of the QoE measurement for the session corresponding to the session recording indication, and to more accurately determine a QoE measurement that has been started currently, to make a better decision and improve communication efficiency.

In still another possible implementation, the second indication information, the third indication information, or the fourth indication information includes a service type corresponding to the session corresponding to the session recording indication.

In still another possible implementation, before the target access network device receives the first indication information from the terminal device, the method further includes: The target access network device sends fifth indication information to an access stratum AS of the terminal device, where the fifth indication information indicates the terminal device to hand over to the target access network device.

In still another possible implementation, the first indication information indicates a QoE measurement that has been currently started and is being executed by the terminal device.

In still another possible implementation, the method further includes: The target access network device receives priority information from a network management device, where the priority information indicates a priority of at least one QoE measurement; and determines, based on the priority information, whether to process the QoE measurement executed by the terminal device.

In the foregoing method, the target access network device obtains the priority information, and determines, based on the priority information, whether to process the QoE measurement, so that a specific requirement of an operator can be met. For example, the operator pays more attention to a QoE measurement for a service.

In still another possible implementation, the method further includes: The target access network device sends sixth indication information to the terminal device when determining to process the QoE measurement executed by the terminal device, where the sixth indication information indicates the terminal device to pause or cancel the QoE measurement.

In the foregoing method, when load of the target access network device is high, the target access network device may send indication information to the terminal device, to indicate the terminal device to pause or cancel the QoE measurement, to reduce the load and improve communication efficiency.

In still another possible implementation, the priority information includes at least one of the following: priority information of a service type, priority information of a network slice, and priority information of the terminal device.

In still another possible implementation, after the target access network device receives the first indication information from the terminal device, the method further includes: The target access network device sends at least one of access stratum AS configuration information and an AS measurement result to a trace collection entity TCE, where the at least one of the AS configuration information and the AS measurement result is used by the TCE to determine AS configuration information and/or an AS measurement result corresponding to a measurement result of the QoE measurement that has been started by the terminal device.

In the foregoing method, because the AS configuration information and the AS measurement result may change at any time, in a QoE scenario, after receiving the first indication information from the terminal device, the target access network device sends the AS configuration information and the AS measurement result to the TCE. Only the AS configuration information and the AS measurement result that are sent after the first indication information is received can be used by the TCE to analyze the measurement result of the QoE measurement, thereby optimizing a configuration of the target access network device and improving communication efficiency.

In still another possible implementation, the method further includes: The target access network device sends the first indication information to the TCE.

In still another possible implementation, the method further includes: The target access network device sends access stratum AS configuration information and/or an AS measurement result to a TCE. The target access network device sends the first indication information to the TCE, where the first indication information includes identification information, and the identification information is used to determine AS configuration information and/or an AS measurement result corresponding to a measurement result of the QoE measurement that has been started by the terminal device.

In the foregoing method, because the AS configuration information and the AS measurement result may change at any time, in a QoE scenario, after sending the AS configuration information and the AS measurement result to the TCE, the target access network device sends the first indication information to the TCE. The identification information included in the first indication information includes moment information, and the moment information is used by the TCE to select corresponding AS configuration information and AS measurement result, in other words, the AS configuration information and the AS measurement result that are after the moment information may be selected for the TCE to analyze the measurement result of the QoE measurement, to optimize a configuration of the target access network device and improve communication efficiency.

In still another possible implementation, the method further includes: The target access network device determines, based on the first indication information, that the QoE measurement has been configured for the terminal device.

In the foregoing method, the target access network device may directly determine, based on the first indication information, that the QoE measurement has been configured for the terminal device. This helps the target access network device quickly perform resource scheduling.

In still another possible implementation, the method further includes: The target access network device obtains seventh indication information, where the seventh indication information indicates the QoE measurement that has been configured for the terminal device. The target access network device sends eighth indication information to the terminal device, where the eighth indication information indicates the terminal device to continue to execute, cancel, pause, or stop the QoE measurement that has been configured.

In the foregoing method, the target access network device obtains the seventh indication information from the source access network device or the terminal device, to determine that the QoE measurement has been configured for the terminal device. This helps the target access network device select a proper policy to process the QoE measurement, and quickly perform resource scheduling.

In another possible implementation, that the target access network device obtains seventh indication information includes: The target access network device receives the seventh indication information from the source access network device.

In still another possible implementation, that the target access network device obtains seventh indication information includes: The target access network device receives the seventh indication information from the terminal device.

In still another possible implementation, the method further includes: The target access network device obtains configuration information corresponding to the QoE measurement that has been configured.

In still another possible implementation, that the target access network device obtains configuration information corresponding to the QoE measurement that has been configured includes: The target access network device receives, from the source access network device, the configuration information corresponding to the QoE measurement that has been configured.

In still another possible implementation, that the target access network device obtains configuration information corresponding to the QoE measurement that has been configured includes: The target access network device receives, from the terminal device, the configuration information corresponding to the QoE measurement that has been configured.

In still another possible implementation, the eighth indication information indicates the terminal device to continue to execute a first QoE measurement, where the first QoE measurement is at least one of QoE measurements that have been configured for the terminal device.

In still another possible implementation, the seventh indication information includes: a service type corresponding to the QoE measurement that has been configured for the terminal device.

A second aspect of embodiments of this application discloses a method for measuring quality of experience QoE. The method includes: A source access network device determines that a terminal device is handed over from the source access network device to a target access network device. The source access network device sends first indication information to the target access network device, where the first indication information indicates a quality of experience QoE measurement that has been started by the terminal device.

In a possible implementation, the first indication information includes at least one of the following: a service type corresponding to the QoE measurement that has been started by the terminal device, identification information of a network slice corresponding to the QoE measurement that has been started, and a session recording indication of the terminal device.

In another possible implementation, when the first indication information includes the session recording indication, the method further includes: The source access network device sends second indication information to the target access network device, where the second indication information indicates that a QoE measurement for a session corresponding to the session recording indication is in a started and executing state, a stopped state, or a completed state.

In still another possible implementation, when the first indication information includes the session recording indication, the method further includes: The source access network device sends third indication information or fourth indication information to the target access network device, where the third indication information indicates that a QoE measurement for a session corresponding to the session recording indication is in a started and executing state, and the fourth indication information indicates that a QoE measurement for a session corresponding to the session recording indication is in a stopped state or a completed state.

In still another possible implementation, the second indication information, the third indication information, or the fourth indication information includes a service type corresponding to the session corresponding to the session recording indication.

For technical effects brought by the second aspect or the possible implementations, refer to the descriptions of the technical effects brought by the first aspect or the corresponding implementations.

A third aspect of embodiments of this application discloses a method for measuring quality of experience QoE. The method includes: A terminal device is handed over from a source access network device to a target access network device. The terminal device sends first indication information to the target access network device, where the first indication information indicates a quality of experience QoE measurement that has been started by the terminal device.

In a possible implementation, the method further includes: The terminal device receives a first message from the target access network device, where the first message indicates to pause or cancel at least one QoE measurement other than the QoE measurement that has been started.

In another possible implementation, the method further includes: An access stratum AS of the terminal device receives fifth indication information from the target access network device, where the fifth indication information indicates the terminal device to hand over to the target access network device.

In still another possible implementation, before the terminal device sends first indication information to the target access network device, the method further includes: The AS of the terminal device sends the fifth indication information to an upper layer of the AS of the terminal device.

In still another possible implementation, the first indication information indicates a QoE measurement that has been currently started and is being executed by the terminal device.

In still another possible implementation, the method further includes: The AS of the terminal device receives the first indication information from the upper layer of the AS of the terminal device.

In still another possible implementation, the first indication information includes at least one of the following: a service type corresponding to the QoE measurement that has been started by the terminal device, identification information of a network slice corresponding to the QoE measurement that has been started, and a session recording indication of the terminal device.

In still another possible implementation, when the first indication information includes the session recording indication, the method further includes: The terminal device sends second indication information to the source access network device, where the second indication information indicates that a QoE measurement for a session corresponding to the session recording indication is in a started and executing state, a stopped state, or a completed state.

In still another possible implementation, when the first indication information includes the session recording indication, the method further includes: The terminal device sends third indication information or fourth indication information to the source access network device, where the third indication information indicates that a QoE measurement for a session corresponding to the session recording indication is in a started and executing state, and the fourth indication information indicates that a QoE measurement for a session corresponding to the session recording indication is in a stopped state or a completed state.

For technical effects brought by the third aspect or the possible implementations, refer to the descriptions of the technical effects brought by the first aspect or the corresponding implementations.

A fourth aspect of embodiments of this application discloses a method for measuring quality of experience QoE. The method includes: An access network device receives priority information from a network management device, where the priority information indicates a priority of at least one quality of experience QoE measurement. The access network device determines, based on the priority information, whether to process a QoE measurement executed by the terminal device.

In the foregoing method, the access network device obtains the priority information, and determines, based on the priority information, whether to process the QoE measurement, so that a specific requirement of an operator can be met. For example, the operator pays more attention to a QoE measurement for a service.

In a possible implementation, the method further includes: The access network device sends indication information to the terminal device when determining to process the QoE measurement executed by the terminal device, where the indication information indicates the terminal device to pause or cancel the QoE measurement.

In the foregoing method, when load of the access network device is high, the access network device may send the indication information to the terminal device, to indicate the terminal device to pause or cancel the QoE measurement, to reduce the load and improve communication efficiency.

In another possible implementation, the priority information includes at least one of the following: priority information of a service type, priority information of a network slice, and priority information of the terminal device.

A fifth aspect of embodiments of this application discloses a method for measuring quality of experience QoE. The method includes: A network management device determines priority information. The network management device sends the priority information to an access network device, where the priority information indicates a priority of at least one quality of experience QoE measurement, and the priority information is used by the access network device to determine whether to process a QoE measurement executed by a terminal device.

In a possible implementation, the priority information includes at least one of the following: priority information of a service type, priority information of a network slice, and priority information of the terminal device.

For technical effects brought by the fifth aspect or the possible implementations, refer to the description of the technical effects brought by the fourth aspect or the corresponding implementations.

A sixth aspect of embodiments of this application discloses a method for measuring quality of experience QoE. The method includes: An access network device receives first indication information from a terminal device, where the first indication information indicates a quality of experience QoE measurement that has been started by the terminal device. The access network device sends at least one of access stratum AS configuration information and an AS measurement result to a trace collection entity TCE, where the at least one of the AS configuration information and the AS measurement result is used by the TCE to determine AS configuration information and/or an AS measurement result corresponding to a measurement result of the QoE measurement that has been started by the terminal device.

In the foregoing method, because the AS configuration information and the AS measurement result may change at any time, in a QoE scenario, after receiving the first indication information from the terminal device, the access network device sends the AS configuration information and the AS measurement result to the TCE. Only the AS configuration information and the AS measurement result that are sent after the first indication information is received can be used by the TCE to analyze the measurement result of the QoE measurement, thereby optimizing a configuration of the target access network device and improving communication efficiency.

In a possible implementation, the method further includes: The access network device sends the first indication information to the TCE.

In another possible implementation, before the access network device sends the first indication information to the TCE, the method further includes: The access network device receives second indication information from the terminal device, where the second indication information indicates that a QoE measurement corresponding to a first session is in a stopped state or a completed state.

In still another possible implementation, the method further includes: The access network device sends the second indication information to the TCE.

A seventh aspect of embodiments of this application discloses a method for measuring quality of experience QoE. The method includes: A trace collection entity TCE receives first indication information from an access network device, where the first indication information indicates a quality of experience QoE measurement that has been started by a terminal device. The TCE receives at least one of access stratum AS configuration information and an AS measurement result from the access network device. The TCE determines, based on the at least one of the AS configuration information and the AS measurement result, AS configuration information and/or an AS measurement result corresponding to a measurement result of the QoE measurement that has been started.

In a possible implementation, the method further includes: The TCE receives second indication information from the access network device, where the second indication information indicates that a QoE measurement corresponding to a first session is in a stopped state or a completed state.

For technical effects brought by the seventh aspect or the possible implementations, refer to the descriptions of the technical effects brought by the sixth aspect or the corresponding implementations.

An eighth aspect of embodiments of this application discloses a method for measuring quality of experience QoE. The method includes: An access network device sends access stratum AS configuration information and/or an AS measurement result to a trace collection entity TCE. The access network device sends a first message to the TCE, where the first message includes first indication information, the first indication information indicates a quality of experience QoE measurement that has been started by a terminal device, the first message includes identification information, and the identification information is used to determine AS configuration information and/or an AS measurement result corresponding to a measurement result of the QoE measurement that has been started by the terminal device.

In the foregoing method, because the AS configuration information and the AS measurement result may change at any time, in a QoE scenario, after sending the AS configuration information and the AS measurement result to the TCE, the access network device sends the first indication information to the TCE. The identification information included in the first indication information includes moment information, and the moment information is used by the TCE to select corresponding AS configuration information and AS measurement result, in other words, the AS configuration information and the AS measurement result that are after the moment information may be selected for the TCE to analyze the measurement result of the QoE measurement, to optimize a configuration of the target access network device and improve communication efficiency.

In a possible implementation, before the access network device sends the first message to the TCE, the method further includes: The access network device receives the first indication information from the terminal device.

In another possible implementation, the identification information includes an identifier of the terminal device and/or moment information. The moment information indicates a moment at which the access network device receives the first indication information from the terminal device.

In still another possible implementation, before the access network device sends the first message to the TCE, the method further includes: The access network device receives second indication information from the terminal device, where the second indication information indicates that a QoE measurement corresponding to a first session is in a stopped state or a completed state.

A ninth aspect of embodiments of this application discloses a method for measuring quality of experience QoE. The method includes: A trace collection entity TCE receives access stratum AS configuration information and/or an AS measurement result from an access network device. The TCE receives a first message from the access network device, where the first message includes first indication information, the first indication information indicates a quality of experience QoE measurement that has been started by a terminal device, the first message includes identification information, and the identification information is used to determine AS configuration information and/or an AS measurement result corresponding to a measurement result of the QoE measurement that has been started by the terminal device.

In a possible implementation, the identification information includes an identifier of the terminal device and/or moment information. The moment information indicates a moment at which the access network device receives the first indication information from the terminal device.

For technical effects brought by the ninth aspect or the possible implementations, refer to the descriptions of the technical effects brought by the eighth aspect or the corresponding implementations.

A tenth aspect of embodiments of this application discloses a method for measuring quality of experience QoE. The method includes:

A target access network device obtains first indication information, where the first indication information indicates a QoE measurement that has been configured for a terminal device.

The target access network device sends second indication information to the terminal device, where the second indication information indicates the terminal device to continue to execute, cancel, pause, or stop the QoE measurement that has been configured.

In the foregoing method, because excessively frequent QoE measurements may increase load of the access network device and affect communication efficiency, the target access network device determines, by receiving the first indication information from the source access network device or the terminal device, that the QoE measurement has been configured for the terminal device, so that the target access network device can process the QoE measurement, for example, continue to execute, pause, or cancel the QoE measurement, to properly schedule resources.

In an optional implementation, that the target access network device obtains first indication information includes: The target access network device receives the first indication information from the source access network device.

In another optional implementation, that the target access network device obtains first indication information includes: The target access network device receives the first indication information from the terminal device.

In an optional implementation, the method further includes: The target access network device obtains configuration information corresponding to the QoE measurement that has been configured.

In a possible implementation, that the target access network device obtains configuration information corresponding to the QoE measurement that has been configured includes: The target access network device receives, from the source access network device, the configuration information corresponding to the QoE measurement that has been configured.

In a possible implementation, that the target access network device obtains configuration information corresponding to the QoE measurement that has been configured includes: The target access network device receives, from the terminal device, the configuration information corresponding to the QoE measurement that has been configured.

In still another optional manner, the second indication information indicates the terminal device to continue to execute a first QoE measurement, where the first QoE measurement is at least one of QoE measurements that have been configured for the terminal device.

In still another optional manner, the first indication information includes: a service type corresponding to the QoE measurement that has been configured for the terminal device.

An eleventh aspect of embodiments of this application discloses a method for measuring quality of experience QoE. The method includes: A source access network device determines that a terminal device is handed over from the source access network device to a target access network device. The source access network device sends first indication information to the target access network device, where the first indication information indicates a QoE measurement that has been configured for the terminal device.

In a possible implementation, the source access network device sends, to the target access network device, configuration information corresponding to the QoE measurement that has been configured.

In another possible implementation, the first indication information includes: a service type corresponding to the QoE measurement that has been configured for the terminal device.

For technical effects brought by the eleventh aspect or the possible implementations, refer to the descriptions of the technical effects brought by the tenth aspect or the corresponding implementations.

A twelfth aspect of embodiments of this application discloses a method for measuring quality of experience QoE. The method includes: A terminal device determines to be handed over from a source access network device to a target access network device. The terminal device sends first indication information to the target access network device, where the first indication information indicates a QoE measurement that has been configured for the terminal device.

In a possible implementation, the terminal device receives second indication information from the target access network device, where the second indication information indicates the terminal device to continue to execute, cancel, pause, or stop the QoE measurement that has been configured.

In a possible implementation, the terminal device sends, to the target access network device, configuration information corresponding to the QoE measurement that has been configured.

In another optional manner, the second indication information indicates the terminal device to continue to execute a first QoE measurement, where the first QoE measurement is at least one of QoE measurements that have been configured for the terminal device.

In still another possible implementation, the first indication information includes: a service type corresponding to the QoE measurement that has been configured for the terminal device.

For technical effects brought by the twelfth aspect or the possible implementations, refer to the descriptions of the technical effects brought by the tenth aspect or the corresponding implementations.

A thirteenth aspect of embodiments of this application discloses an apparatus for measuring quality of experience QoE. The apparatus may be a target access network device or a chip in a target access network device, and includes: a processing module, configured to determine that a terminal device is handed over from a source access network device to the target access network device. The processing module is configured to obtain first indication information by using a communication module, where the first indication information indicates a quality of experience QoE measurement that has been started by the terminal device.

In a possible implementation, the communication module is configured to send a first message to the terminal device based on the first indication information, where the first message indicates the terminal device to pause or cancel at least one QoE measurement other than the QoE measurement that has been started.

In another possible implementation, the communication module is configured to receive the first indication information from the source access network device.

In still another possible implementation, the communication module is configured to receive the first indication information from the terminal device.

In still another possible implementation, the first indication information includes at least one of the following: a service type corresponding to the QoE measurement that has been started by the terminal device, identification information of a network slice corresponding to the QoE measurement that has been started, and a session recording indication of the terminal device.

In still another possible implementation, when the first indication information includes the session recording indication, the communication module is further configured to obtain second indication information, where the second indication information indicates that a QoE measurement for a session corresponding to the session recording indication is in a started and executing state, a stopped state, or a completed state.

In still another possible implementation, when the first indication information includes the session recording indication, the communication module is further configured to obtain third indication information or fourth indication information, where the third indication information indicates that a QoE measurement for a session corresponding to the session recording indication is in a started and executing state, and the fourth indication information indicates that a QoE measurement for a session corresponding to the session recording indication is in a stopped state or a completed state.

In still another possible implementation, the second indication information, the third indication information, or the fourth indication information includes a service type corresponding to the session corresponding to the session recording indication.

In still another possible implementation, before receiving the first indication information from the terminal device, the communication module is further configured to send fifth indication information to an access stratum AS of the terminal device, where the fifth indication information indicates the terminal device to hand over to the target access network device.

In still another possible implementation, the first indication information indicates a QoE measurement that has been currently started and is being executed by the terminal device.

In still another possible implementation, the communication module is configured to receive priority information from a network management device, where the priority information indicates a priority of at least one QoE measurement; and the processing module is configured to determine, based on the priority information, whether to process the QoE measurement executed by the terminal device.

In still another possible implementation, when determining to process the QoE measurement executed by the terminal device, the processing module is configured to send sixth indication information to the terminal device by using the communication module, where the sixth indication information indicates the terminal device to pause or cancel the QoE measurement.

In still another possible implementation, the priority information includes at least one of the following: priority information of a service type, priority information of a network slice, and priority information of the terminal device.

In still another possible implementation, after receiving the first indication information from the terminal device, the communication module is further configured to send at least one of access stratum AS configuration information and an AS measurement result to a trace collection entity TCE, where the at least one of the AS configuration information and the AS measurement result is used by the TCE to determine AS configuration information and/or an AS measurement result corresponding to a measurement result of the QoE measurement that has been started by the terminal device.

In still another possible implementation, the communication module is further configured to send the first indication information to the TCE.

In still another possible implementation, the communication module is further configured to send access stratum AS configuration information and/or an AS measurement result to the TCE; and send the first indication information to the TCE, where the first indication information includes identification information, and the identification information is used to determine AS configuration information and/or an AS measurement result corresponding to a measurement result of the QoE measurement that has been started by the terminal device.

For technical effects brought by the thirteenth aspect or the possible implementations, refer to the descriptions of the technical effects brought by the first aspect or the corresponding implementations.

A fourteenth aspect of embodiments of this application discloses an apparatus for measuring quality of experience QoE. The apparatus may be a source access network device or a chip in a source access network device, and includes: a processing module, configured to determine that a terminal device is handed over from the source access network device to a target access network device; and a communication module, configured to send first indication information to the target access network device, where the first indication information indicates a quality of experience QoE measurement that has been started by the terminal device.

In a possible implementation, the first indication information includes at least one of the following: a service type corresponding to the QoE measurement that has been started by the terminal device, identification information of a network slice corresponding to the QoE measurement that has been started, and a session recording indication of the terminal device.

In another possible implementation, when the first indication information includes the session recording indication, the communication module is further configured to send second indication information to the target access network device, where the second indication information indicates that a QoE measurement for a session corresponding to the session recording indication is in a started and executing state, a stopped state, or a completed state.

In still another possible implementation, when the first indication information includes the session recording indication, the communication module is further configured to send third indication information or fourth indication information to the target access network device, where the third indication information indicates that a QoE measurement for a session corresponding to the session recording indication is in a started and executing state, and the fourth indication information indicates that a QoE measurement for a session corresponding to the session recording indication is in a stopped state or a completed state.

In still another possible implementation, the second indication information, the third indication information, or the fourth indication information includes a service type corresponding to the session corresponding to the session recording indication.

For technical effects brought by the fourteenth aspect or the possible implementations, refer to the descriptions of the technical effects brought by the second aspect or the corresponding implementations.

A fifteenth aspect of embodiments of this application discloses an apparatus for measuring quality of experience QoE. The apparatus may be a terminal device or a chip in a terminal device, and includes: a processing module, configured to hand over from a source access network device to a target access network device; and a communication module, configured to send first indication information to the target access network device, where the first indication information indicates a quality of experience QoE measurement that has been started by the terminal device.

In a possible implementation, the communication module is further configured to receive a first message from the target access network device, where the first message indicates to pause or cancel at least one QoE measurement other than the QoE measurement that has been started.

In another possible implementation, the communication module is further configured to receive fifth indication information from the target access network device, where the fifth indication information indicates the terminal device to hand over to the target access network device.

In still another possible implementation, before sending the first indication information to the target access network device, the communication module is further configured to send the fifth indication information to an upper layer of an AS of the terminal device.

In still another possible implementation, the first indication information indicates a QoE measurement that has been currently started and is being executed by the terminal device.

In still another possible implementation, the communication module is further configured to receive the first indication information from the upper layer of the AS of the terminal device.

In still another possible implementation, the first indication information includes at least one of the following: a service type corresponding to the QoE measurement that has been started by the terminal device, identification information of a network slice corresponding to the QoE measurement that has been started, and a session recording indication of the terminal device.

In still another possible implementation, when the first indication information includes the session recording indication, the communication module is further configured to send second indication information to the source access network device, where the second indication information indicates that a QoE measurement for a session corresponding to the session recording indication is in a started and executing state, a stopped state, or a completed state.

In still another possible implementation, when the first indication information includes the session recording indication, the communication module is further configured to send third indication information or fourth indication information to the source access network device, where the third indication information indicates that a QoE measurement for a session corresponding to the session recording indication is in a started and executing state, and the fourth indication information indicates that a QoE measurement for a session corresponding to the session recording indication is in a stopped state or a completed state.

For technical effects brought by the fifteenth aspect or the possible implementations, refer to the description of the technical effects brought by the third aspect or the corresponding implementations.

A sixteenth aspect of embodiments of this application discloses an apparatus for measuring quality of experience QoE. The apparatus may be a target access network device or a chip in the target access network device. The apparatus includes a processor and an interface circuit. Optionally, the apparatus further includes a memory. The interface circuit is configured to: receive a signal from another apparatus other than the apparatus, and transmit the signal to the processor, or send the signal from the processor to the another apparatus other than the apparatus. The processor is configured to perform the method described in the first aspect or the possible implementations of the first aspect by using a logic circuit or executing code instructions.

A seventeenth aspect of embodiments of this application discloses an apparatus for measuring quality of experience QoE. The apparatus may be a source access network device or a chip in the source access network device. The apparatus includes a processor and an interface circuit. Optionally, the apparatus further includes a memory. The interface circuit is configured to: receive a signal from another apparatus other than the apparatus, and transmit the signal to the processor, or send the signal from the processor to the another apparatus other than the apparatus. The processor is configured to perform the method described in the second aspect or the possible implementations of the second aspect by using a logic circuit or executing code instructions.

An eighteenth aspect of embodiments of this application discloses an apparatus for measuring quality of experience QoE. The apparatus may be a terminal device or a chip in the terminal device. The apparatus includes a processor and an interface circuit. Optionally, the apparatus further includes a memory. The interface circuit is configured to: receive a signal from another apparatus other than the apparatus, and transmit the signal to the processor, or send the signal from the processor to the another apparatus other than the apparatus. The processor is configured to perform the method described in the third aspect or the possible implementations of the third aspect by using a logic circuit or executing code instructions.

A nineteenth aspect of embodiments of this application discloses a computer program. When the computer program is executed by a communication apparatus, the method described in any one of the foregoing aspects and the possible implementations of any one of the aspects is implemented.

A twentieth aspect of embodiments of this application discloses a computer-readable storage medium, where the storage medium stores a computer program or instructions. When the computer program or the instructions is or are executed by a communication apparatus, the method described in any one of the foregoing aspects and the possible implementations of any one of the aspects is implemented.

A twenty-first aspect of embodiments of this application discloses a chip system, where the chip system includes at least one processor, a memory, and an interface circuit. The memory, the interface circuit, and the at least one processor are interconnected through a line, and the at least one memory stores instructions. When the instructions are executed by the processor, the method described in any one of the foregoing aspects and the possible implementations of any one of the aspects is implemented.

A twenty-second aspect of embodiments of this application discloses a system for measuring quality of experience QoE, including the apparatus in the thirteenth aspect or the sixteenth aspect, the apparatus in the fourteenth aspect or the seventeenth aspect, and the apparatus in the fifteenth aspect or the eighteenth aspect.

DESCRIPTION OF EMBODIMENTS

The following describes embodiments of this application with reference to the accompanying drawings in embodiments of this application.

Figure 1:
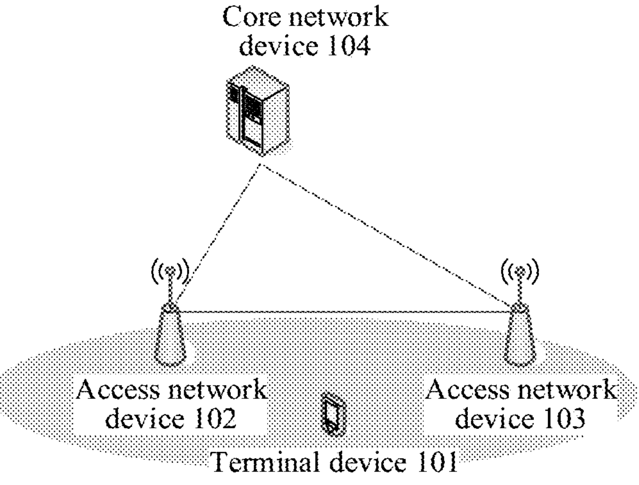
FIG. 1 is a schematic diagram of a structure of a system for a QoE measurement according to an embodiment of this application.

FIG. 1 is a schematic diagram of a structure of a system 100 for measuring quality of experience QoE according to an embodiment of this application. The system 100 for the quality of experience QoE measurement includes a terminal device 101, an access network device 102, an access network device 103, and a core network device 104. It should be understood that the system 100 to which a method in embodiments of this application may be applied may include more or fewer access network devices. The access network device and the terminal device may be hardware, may be software obtained through functional division, or may be a combination thereof. The access network device and the terminal device may communicate with each other by using another device or network element. The method in embodiments of this application may be applied to the system 100 shown in FIG. 1.

(1) Terminal device: A terminal device is also referred to as a user equipment (UE), a mobile station (MS), a mobile terminal (MT), or the like. The terminal device includes a device that provides a voice and/or data connectivity for a user. Specifically, the terminal device may include a device that provides a voice for a user, includes a device that provides data connectivity for a user, or includes a device that provides a voice and data connectivity for a user. For example, the terminal device may include a handheld device having a wireless communication function, or a processing device connected to a wireless modem. The terminal device may communicate with a core network through a radio access network (RAN), and exchange a voice or data with the RAN, or exchange a voice and data with the RAN. The terminal device may include a user equipment (UE), a wireless terminal device, a mobile terminal device, a device-to-device (D2D) terminal device, a vehicle-to-everything (V2X) terminal device, a machine-to-machine/machine type communication (M2M/MTC) terminal device, an internet of things (IoT) terminal device, light user equipment (light UE), reduced capability user equipment (reduced capability UE, REDCAP UE), a subscriber unit, a subscriber station, a mobile station, a remote station, an access point (AP), a remote terminal, an access terminal, a user terminal, a user agent, a user device, or the like. For example, the terminal device may be a mobile phone (or referred to as a "cellular" phone), a computer having a mobile terminal device, or a portable, pocket-sized, handheld, or computer built-in mobile apparatus. For example, the terminal device may be a device such as a personal communications service (PCS) phone, a cordless telephone set, a session initiation protocol (SIP) phone, a wireless local loop (WLL) station, or a personal digital assistant (PDA). The terminal device may alternatively be a limited device, for example, a device with relatively low power consumption, a device with a limited storage capability, or a device with a limited computing capability. For example, the terminal device includes an information sensing device such as a barcode, radio frequency identification (RFID), a sensor, a global positioning system (GPS), or a laser scanner.

By way of example, and not limitation, in embodiments of this application, the terminal device may alternatively be a wearable device. The wearable device may also be referred to as a wearable intelligent device, an intelligent wearable device, or the like.

In embodiments of this application, the terminal device may further include a relay. Alternatively, it may be understood that all devices that can perform data communication with the base station may be considered as terminal devices.

If the various terminal devices described above are located in a vehicle (for example, placed in the vehicle or installed in the vehicle), the terminal devices may be considered as in-vehicle terminal devices, and the in-vehicle terminal devices may be implemented as on-board units (OBUs) or communication apparatuses used for OBUs. Alternatively, if the various terminal devices described above are located on a roadside, for example, disposed on a roadside infrastructure, the terminal devices may be implemented as roadside units (RSUs) or communication apparatuses used for RSUs.

In embodiments of this application, an apparatus configured to implement a function of the terminal device may be a terminal device, or may be an apparatus that can support a terminal device in implementing the function, for example, a chip system. The apparatus may be installed in the terminal device. In embodiments of this application, the chip system may include a chip, or may include a chip and another discrete component. In the technical solutions provided in embodiments of this application, the technical solutions provided in embodiments of this application are described by using an example in which the apparatus configured to implement the function of the terminal is the terminal device.

(2) Access network (AN) device: An access network device is a radio access network (RAN) node (or device) that connects a terminal to a wireless network, and may also be referred to as a base station. Currently, examples of some RAN nodes are: a further evolved NodeB (gNB), a transmission reception point (TRP), an evolved NodeB (eNB), a radio network controller (RNC), a NodeB (NB), a base station controller (BSC), a base transceiver station (BTS), a home eNodeB (for example, a home evolved NodeB or a home NodeB (HNB)), a baseband unit (BBU), a wireless fidelity (Wi-Fi) access point (AP), and the like. In addition, in a network structure, the access network device may include a central unit (CU) node, a distributed unit (DU) node, or a RAN device including a CU node and a DU node. The RAN device including the CU node and the DU node splits protocol layers of the gNB in the NR system. Some functions of the protocol layers are centrally controlled by a CU, and remaining functions or all functions of the protocol layers are distributed in DUs. The functions of the CU may be further divided. For example, a control plane (CP) is separated from a user plane (UP), in other words, a CU control plane (CU-CP) and a CU user plane (CU-UP) are obtained.

(3) Core network (CN) device: A core network device includes, for example, an access and mobility management function (AMF) entity, a session management function (SMF) entity, a user plane function (UPF) entity, and the like. This is not listed one by one herein. The AMF entity may be responsible for access management and mobility management of a terminal. The SMF entity may be responsible for session management, for example, user session establishment. The UPF entity may be a user plane functional entity, and is mainly responsible for a connection to an external network. It should be noted that an entity in this application may also be referred to as a network element or a functional entity. For example, the AMF entity may also be referred to as an AMF network element or an AMF functional entity. For another example, the SMF entity may also be referred to as an SMF network element or an SMF functional entity.

The following describes some terms in this application for ease of understanding.

1. Multi-radio access technology dual connectivity (MR-DC): In a wireless network, a terminal device may communicate with a plurality of base stations, that is, dual connectivity (DC). In a new protocol, this is also referred to as MR-DC. The plurality of base stations may be base stations that belong to a same radio access technology (RAT) (for example, all are 4G base stations or all are 5G base stations), or may be base stations of different RATs (for example, one is a fourth generation 4G base station, and the other is a fifth generation 5G base station). A network side may provide communication services for the terminal device using resources of the plurality of base stations, to provide high-rate transmission for the terminal device. A base station that has control plane neighbor interaction with a core network in DC is referred to as a master base station (master node (MN)), and another base station is referred to as a secondary base station (secondary node (SN)). Each base station has a different radio link control (RLC) protocol/media access control (MAC) entity. Data radio bearers (DRBs) in DC are classified into master cell group bearers (MCG Bearers)/secondary cell group bearers (SCG Bearers)/split bearers. The MCG bearer means that the RLC/MAC entity of the DRB is only on the master base station, the SCG bearer means that the RLC/MAC entity of the DRB is only on the secondary base station, and the split bearer means that the RLC/MAC entity of the DRB is on both the master base station and the secondary base station. A bearer whose packet data convergence protocol (PDCP) terminates on the MN is referred to as an MN terminated bearer, to be specific, downlink (DL) data directly arrives at the MN from the core network, is processed by a PDCP/service data adaptation protocol (SDAP) of the MN, and then sent to the terminal device via RLC/MAC. Uplink (UL) data is processed by the PDCP/SDAP of the MN, and then sent to the core network. Similarly, a bearer whose PDCP terminates on the SN is referred to as an SN terminated bearer. To be specific, the DL data directly arrives at the SN from the core network, is processed by a PDCP/SDAP of the SN, and then sent to the terminal device via RLC/MAC. The UL data is processed by the PDCP/SDAP of the SN and then sent to the core network.

2. Minimization of drive tests (MDT): A basic idea of a minimization of drive tests technology is that operators replace some conventional drive test work with measurement and measurement result sending performed by commercial terminals of subscribed users, to automatically collect measurement data of the terminals, to detect problems and faults in a wireless network for optimization. Application scenarios of the technology are as follows: The operators usually perform routine network coverage drive tests every month, and also perform call quality drive tests in specific areas to address user complaints, where MDT may be used to replace the tests in these scenarios. Measurement types in the existing MDT technology may include signal level measurement, quality of service (QoS) measurement, and accessibility measurement. The MDT includes logged MDT and immediate MDT. The immediate MDT is mainly for measuring a terminal device in an RRC connected (RRC_CONNECTED) state, and the logged MDT is mainly for measuring a terminal device in an idle (RRC_IDLE) state or a terminal device in an RRC inactive (RRC_INACTIVE) state. The immediate MDT is usually used to measure a data volume, a throughput rate, a packet transmission delay, a packet loss rate, a processing delay, and the like of the terminal device. The logged MDT is usually used for the terminal device to measure received signal strength. An access network device initiates MDT measurement collection tasks in two scenarios: One is to initiate signaling-based MDT and the other is to initiate management-based MDT. The signaling-based MDT is MDT for a specific terminal device. The access network device receives indication information from a core network, and the indication information indicates to perform MDT for the terminal device. The management-based MDT is not MDT for a specific terminal device. The access network device receives a message for performing MDT from operation, administration and maintenance (OAM) or element manager (EM), and then the access network device selects, based on a specific policy, a terminal device from terminal devices under the access network device to perform an MDT measurement.

Some L2 measurements are further defined in radio, and are used by the network side to perform statistics on some network performance, to perform functions such as radio link management, radio resource management, and network maintenance. The L2 measurements are performed for statistics for one terminal device, for example, a service throughput, service traffic, a processing delay of the terminal device, and an air interface delay of the terminal device.

Figure 2A:
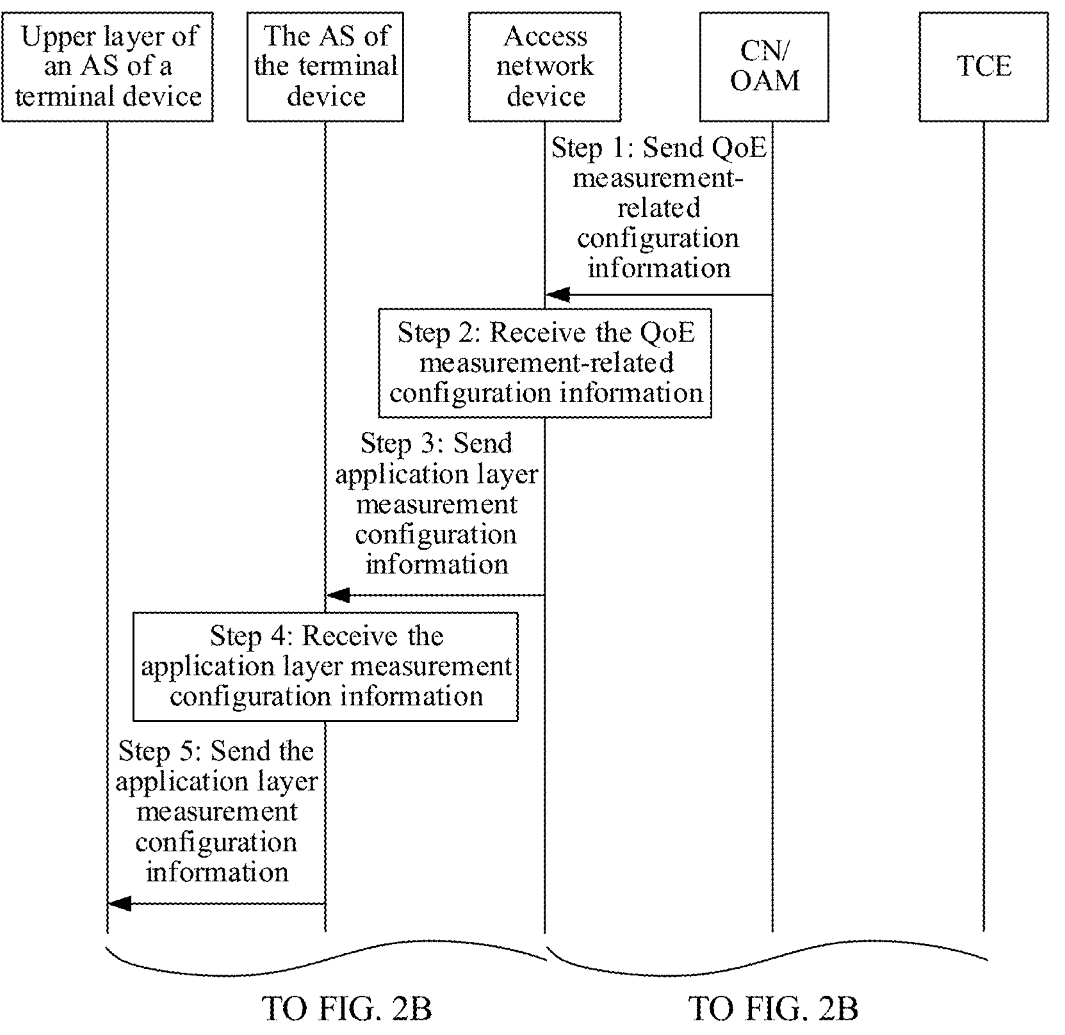
FIG. 2A and FIG. 2B is a schematic flowchart of a QoE measurement according to an embodiment of this application.
Figure 2B:
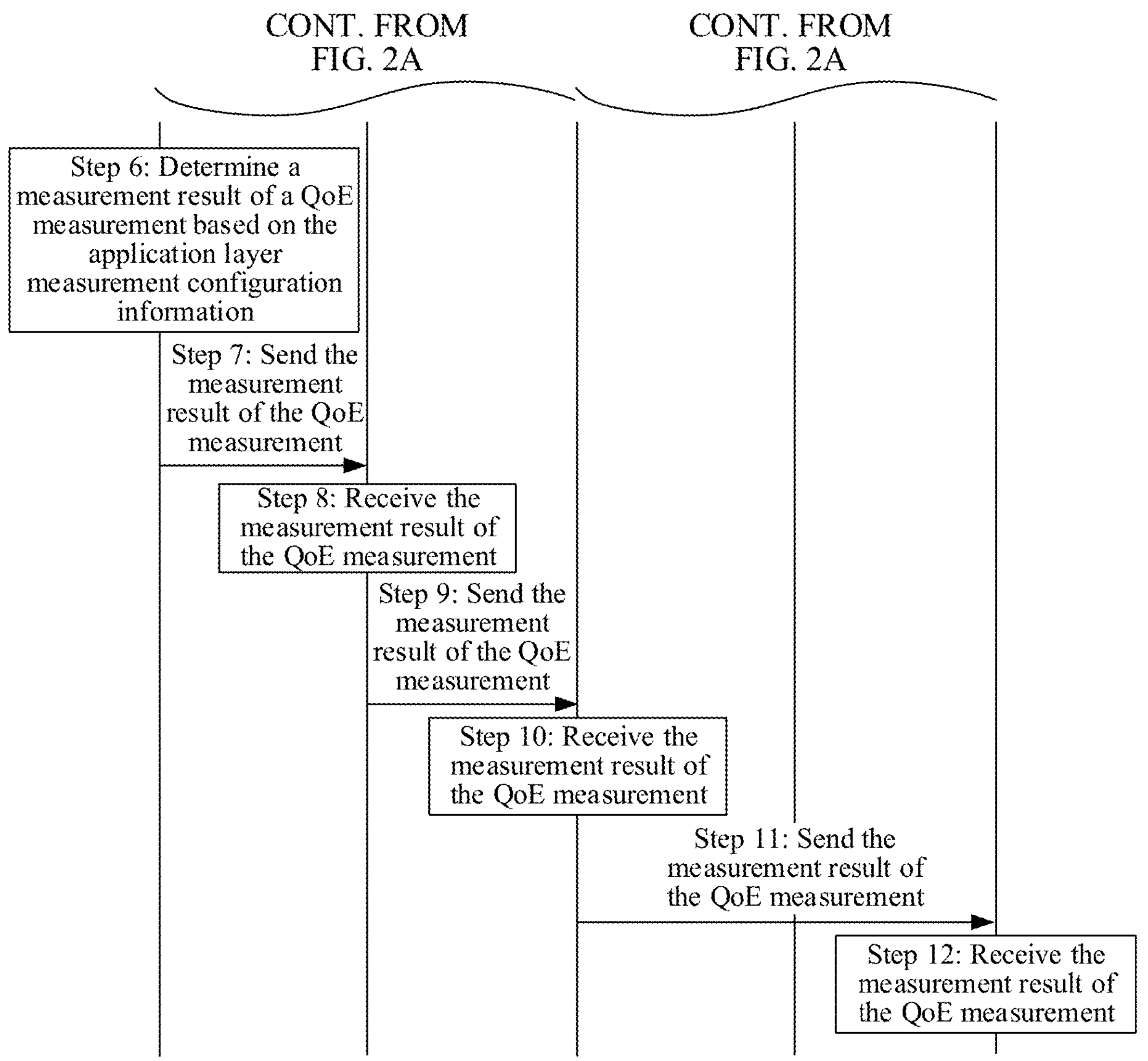

3. QoE management: For some streaming services or voice services, such as streaming services and multimedia telephony services for IP multimedia subsystem (multimedia telephony service for IMS, MTSI), and virtual reality (VR) services, signal quality alone cannot reflect user experience of these services. Therefore, operators intend to learn of user experience, to better optimize networks to improve user experience. Such measurement collection is referred to as QoE measurement collection, or may be referred to as application layer measurement collection (in other words, a QoE measurement may also be referred to as an application layer measurement). Such measurement may alternatively be initiated through signaling-based MDT and management-based MDT. As shown in FIG. 2A and FIG. 2B, a QoE measurement process is as follows.

Step 1: A CN, OAM, or an EM sends QoE measurement-related configuration information to an access network device.

Step 2: The access network device receives the QoE measurement-related configuration information from the CN or the OAM or the EM.

For a signaling-based QoE measurement, the access network device receives the QoE measurement-related configuration information from the CN. The QoE measurement-related configuration information includes application layer measurement configuration information. The QoE measurement-related configuration information includes a container, and the container includes the application layer measurement configuration information. The access network device obtains, from the CN, QoE measurement-related configuration information for a specific terminal device. For example, the QoE measurement-related configuration information is sent via an interface message between the access network device and the CN for a terminal device.

For a management-based QoE measurement, the access network device receives QoE measurement-related configuration information from the OAM or the EM. The QoE measurement-related configuration information includes application layer measurement configuration information. The QoE measurement-related configuration information includes a container, and the container includes the application layer measurement configuration information. The access network device obtains, from the OAM or the EM, the QoE measurement-related configuration information that is not for a specific terminal device.

In addition to receiving the application layer measurement configuration information from the CN, the OAM, or the EM, the access network device may further determine the application layer measurement configuration information by the access network device.

In addition, the application layer measurement configuration information may further include a notification message. The notification message indicates the terminal device to report an application layer indicator. The application layer indicator may include one or more of the following items. This is not limited herein.

(1) Average throughput: An average throughput indicates a total quantity of bits received by an application layer of UE within a measurement interval, for example, streaming media services.

(2) Initial playout delay: An initial playout delay refers to an initial playout delay when streaming media starts to be displayed. For example, the initial playout delay may be defined as time from a moment at which a first segment of media is obtained to a moment at which the streaming media is extracted from a buffer of a client.

(3) Buffer level: A buffer level indicates duration in which media data can be played from a current playout moment.

(4) Playout delay: A playout delay indicates a playout delay of starting the streaming media. For example, the playout delay may be specifically defined as a delay from a moment at which a dynamic adaptive streaming over hypertext transfer protocol (dynamic adaptive streaming over HTTP, DASH) player receives a playout/rollback/start trigger to a moment of media playout.

(5) Deterioration duration: Deterioration duration indicates an interval between Nepal time (NPT) corresponding to a good-quality frame exactly before deterioration and Nepal time corresponding to the subsequent first good-quality frame. The good-quality frame is a frame that is completely accepted, and all parts of a picture corresponding to the frame include correct content or the frame is a new frame (that is, does not depend on any previously decoded frame) or depends only on a previously decoded good-quality frame.

(6) Quantity of consecutive lost packets: A quantity of consecutive lost packets indicates a quantity of consecutive lost real-time transport protocol (RTP) packets.

(7) Jitter duration: Jitter indicates that a difference between an actual playout moment and a wanted playout moment of a frame exceeds a threshold. A wanted playout moment of a frame is a playout moment of the previous playout frame plus a difference between Nepal time of the current frame and Nepal time of a previous frame.

(8) Synchronization loss duration: Out-of-synchronization indicates that an absolute time difference between value A and value B exceeds a specific threshold. The value A herein refers to a difference between a playout moment of a previous playout frame of a video stream and a playout moment of a previous playout frame of a voice stream. The value B herein refers to a difference between a wanted playout moment of the previous playout frame of the video stream and a wanted playout moment of the previous playout frame of the voice stream.

(9) Round-trip time delay: A round-trip time delay indicates RTP-level round-trip time, plus an additional two-way delay (RTP level->loudspeaker->microphone->RTP level) due to buffering and other processing at a client.

(10) Average bit rate: An average bit rate is a bit rate of media information validly encoded in a measurement periodicity.

Step 3: The access network device sends the application layer measurement configuration information to an access stratum AS of the terminal device.

For the signaling-based QoE measurement, the access network device sends the application layer measurement configuration information to a corresponding terminal device, and the access network device also determines, based on a case whether the terminal device supports a QoE measurement, whether to configure the QoE measurement for the UE.

For the management-based QoE measurement, the access network device selects, based on the QoE measurement-related configuration information sent by the OAM or the EM, a case whether a corresponding QoE measurement is supported by a terminal device, and some other factors, a proper terminal device to perform a QoE measurement. After selecting the proper terminal device, the access network device sends the application layer measurement configuration information to the terminal device.

The access network device may send the application layer measurement configuration information to the terminal device via an RRC message, where the RRC message carries a service type corresponding to the application layer measurement configuration information.

In addition to sending the application layer measurement configuration information to the terminal device, the access network device may further send some other configuration information to the terminal device. The other configuration information notifies the terminal device to report an application layer indicator in a form (for example, an information element form) that can be sensed by the access network device. Alternatively, the access network device notifies the terminal device to report a comprehensive score of an application layer indicator, a comprehensive score of an access stratum indicator, or a comprehensive score obtained by combining the application layer indicator and the access stratum indicator.

Step 4: The access stratum AS of the terminal device receives the application layer measurement configuration information from the access network device.

Step 5: The access stratum AS of the terminal device sends the application layer measurement configuration information to an upper layer of the AS of the terminal device.

The upper layer of the access stratum (AS) of the terminal device may be an application layer, or may be a layer used for QoE measurement. In addition to sending the application layer measurement configuration information to the upper layer of the AS of the terminal device, the AS of the terminal device further sends the service type corresponding to the application layer measurement configuration information, and the configuration information that is received from the access network device and that notifies the terminal device of the application layer indicator or the comprehensive score in a form that can be sensed by the access network device.

Step 6: The upper layer of the AS of the terminal device performs a QoE measurement based on the application layer measurement configuration information, and determines a measurement result of the QoE measurement.

Step 7: The upper layer of the AS of the terminal device sends the measurement result of the QoE measurement to the AS of the terminal device.

The upper layer of the AS of the terminal device may report the measurement result of the QoE measurement according to a specific rule (where for example, the rule is included in the application layer measurement configuration information). For example, the upper layer of the AS of the terminal device periodically reports the measurement result of the QoE measurement. For example, the upper layer of the AS of the terminal device reports the measurement result of the QoE measurement only after a session ends.

In addition to sending the measurement result of the QoE measurement to the AS of the terminal device, the upper layer of the AS of the terminal device may further send a service type corresponding to the measurement result of the QoE measurement and the application layer indicator or the comprehensive score in a form that can be sensed by the access network device.

Step 8: The AS of the terminal device receives the measurement result of the QoE measurement from the upper layer of the AS of the terminal device.

Step 9: The AS of the terminal device sends the measurement result of the QoE measurement to the access network device.

In addition to sending the measurement result of the QoE measurement to the access network device, the AS of the terminal device may further send a service type corresponding to the measurement result of the QoE measurement and the application layer indicator or the comprehensive score in a form that can be sensed by the access network device. An RRC message may be sent to the access network device via the AS of the terminal device, and the RRC message carries the measurement result of the QoE measurement and the corresponding service type.

The access network device to which the AS of the terminal device sends the measurement result of the QoE measurement and the access network device that sends the application layer measurement configuration information to the terminal device may be a same access network device, or may be different access network devices.

Step 10: The access network device receives the measurement result of the QoE measurement from the AS of the terminal device.

Step 11: The access network device sends the measurement result of the QoE measurement to a TCE.

The access network device may optimize radio resources based on the application layer indicator or the comprehensive score that is reported by the terminal device and in a form that can be sensed by the access network device. For example, when a measurement result that is of a QoE measurement and that corresponds to an application layer indicator or a comprehensive score is not ideal, the access network device may allocate more resources to a corresponding terminal device that reports the measurement result of the QoE measurement, or increase a scheduling priority of the terminal device.

Step 12: The TCE receives the measurement result of the QoE measurement from the access network device.

Excessively frequent QoE measurements may increase load of the access network device, and affect communication efficiency. Embodiments of this application provide a method for QoE measurement, to reduce the load of the access network device.

Figure 3:
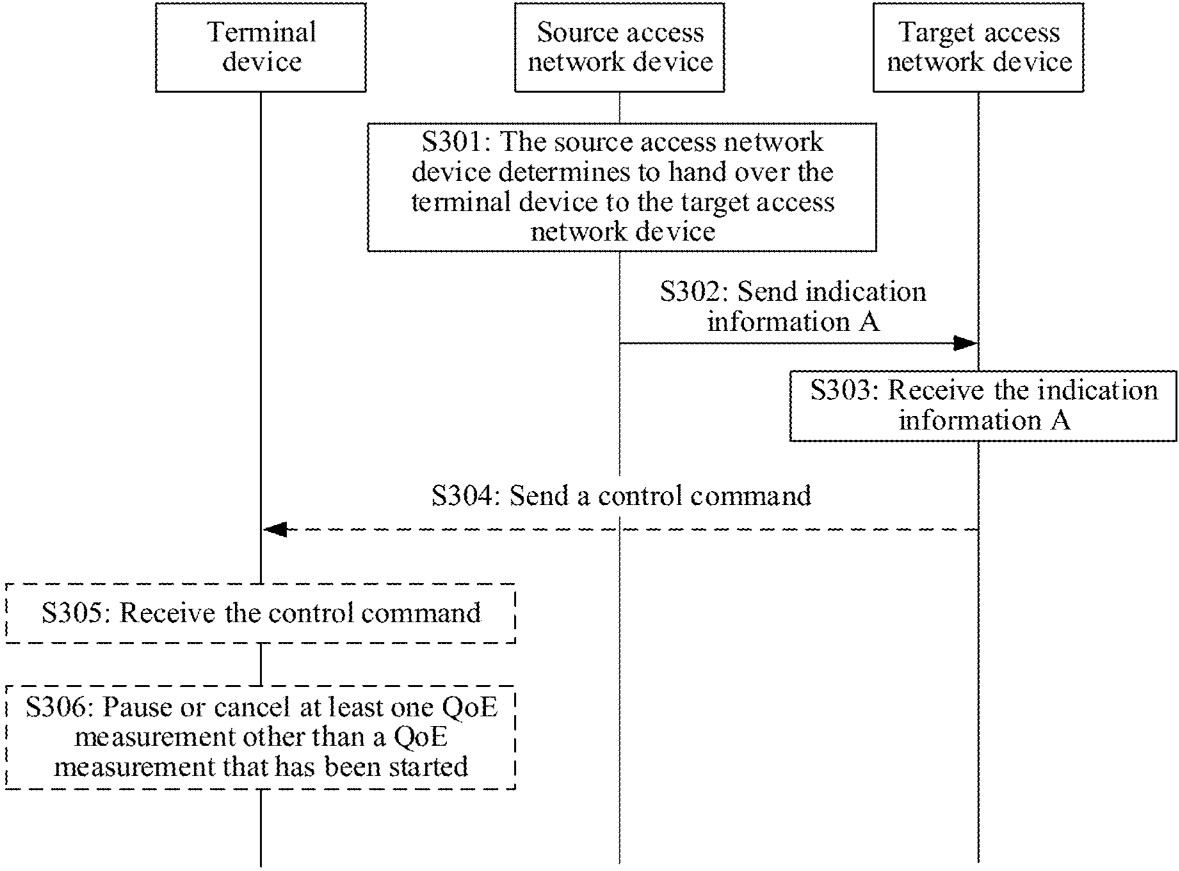
FIG. 3 is a flowchart of a method for a QoE measurement according to an embodiment of this application.

FIG. 3 shows a method for QoE measurement according to an embodiment of this application. The method includes but is not limited to the following steps.

Step S301: A source access network device determines to hand over a terminal device to a target access network device.

Specifically, the source access network device and the target access network device may correspond to different access network devices in different scenarios.

In an MN change scenario in an MR-DC scenario, an MN is intended to be switched from a source group access network device to a target group access network device. The source access network device and the target access network device are respectively a source MN and a target MN.

In an SN change scenario in an MR-DC scenario, an SN is intended to be switched from a source group access network device to a target group access network device. The source access network device and the target access network device are respectively a source SN and a target SN.

In an MR-DC scenario in which an MN and an SN migrate some services to a peer end of each other, for example, in a scenario in which an MN terminated bearer changes to an SN terminated bearer, an SN terminated bearer changes to an MN terminated bearer, an MN terminated MCG bearer changes to an MN terminated SCG/split bearer, or an MN terminated SCG/split bearer changes to an MN terminated MCG bearer, an initiator is the source access network device, and a target end is the target access network device. In this scenario, the handover does not mean that the terminal device disconnects from a transmitting end.

In a non-MR-DC handover scenario, the source access network device and the target access network device are respectively a source base station and a target base station in a handover process.

It should be noted that this step does not mean that the terminal device has been handed over to the target access network device, but means that the source access network device intends to hand over the terminal device to the target access network device.

Step S302: The source access network device sends indication information A to the target access network device.

The indication information A indicates a QoE measurement that has been started by the terminal device.

Specifically, when the terminal device is handed over from the source access network device to the target access network device, or after the terminal device is handed over from the source access network device to the target access network device, the source access network device sends the indication information A to the target access network device, where the indication information A indicates the QoE measurement that has been started by the terminal device. When a service of the terminal device starts at an application layer, the terminal device starts a QoE measurement corresponding to the service.

Specifically, the QoE measurement that has been started by the terminal device may be obtained by the source access network device from the terminal device, or may be obtained from another access network device. This is not limited in this embodiment of this application. For example, when an upper layer of an AS of the terminal device starts the QoE measurement, the upper layer of the AS of the terminal device sends a session recording indication to the AS, to indicate that a session has started or a QoE measurement for a session has been started. The session recording indication remains unchanged throughout an entire session, and different sessions corresponding to one application have different session recording indications. For example, the session recording indication may be a 2-byte character string.

Specifically, the indication information A may be a QoE measurement list, and the list may include at least one of the following: a service type corresponding to the QoE measurement that has been started by the terminal device, identification information of a network slice corresponding to the QoE measurement that has been started, and a session recording indication corresponding to the QoE measurement that has been started by the terminal device. The service type may be a streaming service, an MTSI, a VR service, or the like. The identification information of the network slice may be single network slice selection support information (S-NSSAI), or may be other information identifying the network slice. The session recording indication is an identifier encapsulated by an application layer for a session. The session recording indication remains unchanged throughout an entire session, and different sessions corresponding to one application have different session recording indications. For example, the session recording indication may be a 2-byte character string.

Specifically, when the source access network device migrates some services to the target access network device, the QoE measurement that has been started refers to a QoE measurement that has been started and that corresponds to a service migrated to the target access network device, that is, may be a part of the QoE measurement that has been started in the source access network device.

Specifically, the source access network device and the target access network device may correspond to different access network devices in different scenarios. In this case, the indication information A is carried in different messages by the source access network device and sent to the target access network device in different scenarios.

For example, in the non-MR-DC handover scenario, the indication information A may be carried in a handover request message sent by the source base station to the target base station.

In the MN change scenario in the MR-DC scenario, the indication information A may be carried in a handover request message sent by the source MN to the target MN.

In the SN change scenario in the MR-DC scenario, the indication information A is sent by the source SN to the target SN in the following two manners: In a first manner, the source SN sends the indication information A to the MN, and then the MN sends the indication information A to the target SN after receiving the indication information A. In a second manner, the source SN sends the indication information A to the target SN.

In the MR-DC scenario in which the MN and the SN migrate some services to the peer end of each other, for example, in a scenario in which the MN terminated bearer is changed to the SN terminated bearer, for details, refer to step S301. Details are not described herein again. The initiator is the source access network device, and the target end is the target access network device. The indication information A may be carried in an SN modification request message sent by the initiator to the target end, an SN modification requirement message sent by the initiator to the target end, or an SN addition request message sent by the MN to the SN.

In a possible implementation, before the source access network device sends the indication information A to the target access network device, the terminal device receives QoE measurement-related configuration information. The QoE measurement-related configuration information may be sent by the source access network device to the terminal device, or may be sent by another access network device to the terminal device. This is not limited in this embodiment of this application.

Step S303: The target access network device receives the indication information A sent by the source access network device.

Specifically, the indication information A indicates the QoE measurement that has been started by the terminal device, to be specific, the QoE measurement that has been started by the terminal device includes a QoE measurement that has been started but has been ended and/or a measurement that has been started and is being executed.

In a possible implementation, when the indication information A includes the session recording indication, the method further includes: The target access network device receives indication information B from the source access network device.

Specifically, the indication information B indicates that a QoE measurement for a session corresponding to the session recording indication is in a started and executing state, a started and stopped state, or a started and completed state. The indication information B may further include a service type corresponding to the session corresponding to the session recording indication. The indication information B of the source access network device may be reported by the upper layer of the AS of the terminal device to the source access network device via the AS of the terminal device, or may be reported by the AS of the terminal device to the source access network device.

In an example, when the upper layer of the AS of the terminal device stops or has completed a QoE measurement for a session, the upper layer of the AS of the terminal device sends a piece of indication information B to the AS of the terminal device, where the indication information B indicates that the QoE measurement for the session has been stopped or completed. The indication information B may include the session recording indication, the service type, and an indication indicating that the QoE measurement for the session has been stopped or completed. Then, the AS of the terminal device sends the indication information B to the source access network device.

In a possible implementation, when the indication information A includes the session recording indication, the method further includes: The target access network device receives indication information C or indication information D from the source access network device.

Specifically, the indication information C indicates that a QoE measurement for a session corresponding to the session recording indication is in a started and executing state, and the indication information D indicates that a QoE measurement for a session corresponding to the session recording indication is in a started and stopped state or a started and completed state. The indication information C or the indication information D may further include a service type corresponding to the session corresponding to the session recording indication. The indication information C or the indication information D of the source access network device may be reported by the upper layer of the AS of the terminal device to the source access network device via the AS of the terminal device, or may be reported by the AS of the terminal device to the source access network device.

In an example, when the upper layer of the AS of the terminal device stops or has completed a QoE measurement for a session, the upper layer of the AS of the terminal device sends indication information D to the terminal device, where the indication information D indicates that the QoE measurement for the session has been stopped or completed. The indication information D may include a session recording indication, a service type, and an indication indicating that the QoE measurement for the session has been stopped or completed. Then, the AS of the terminal device sends the indication information D to the source access network device.

It should be noted that, that the target access network device receives the indication information B, and/or the indication information C or the indication information D from the source access network device may be an independent embodiment. That the source access network device determines to hand over the terminal device to the target access network device, the source access network device sends the indication information A to the target access network device, and the target access network device receives the indication information A from the source access network device may be an independent embodiment.

Step S304: The target access network device sends a control command to the terminal device.

Specifically, this step is an optional step. The control command indicates the terminal device to pause or cancel at least one QoE measurement other than the QoE measurement that has been started. The control command is for some service types and some network slices.

Step S305: The terminal device receives the control command from the target access network device.

Specifically, this step is an optional step.

Step S306: The terminal device pauses or cancels the at least one QoE measurement other than the QoE measurement that has been started.

Specifically, this step is an optional step. The terminal device pauses or cancels, based on the control command in step S305, the at least one QoE measurement other than the QoE measurement that has been started.

In an example, the QoE measurements of the terminal device include Measurement 1, Measurement 2, and Measurement 3. Measurement 3 is the QoE measurement that has been started by the terminal device. When load of the target access network device is high, the target access network device sends the control command to the terminal device. After receiving the control command, the terminal device chooses to pause or cancel Measurement 1 and/or Measurement 2. Further, the terminal device may determine, based on priority information, to pause or cancel Measurement 1 or Measurement 2. The priority information may be sent by the target access network device to the terminal device, and the priority information indicates a priority of the QoE measurement. For example, a service type corresponding to Measurement 1 is an MTSI service, a service type corresponding to Measurement 2 is a VR service. The priority information indicates that a priority of the MTSI service is 1, a priority of the VR service is 2, and the priority of the MTSI service is higher than the priority of the VR service. In this case, the terminal device determines, based on the priority information, to pause or cancel Measurement 2.

In the foregoing method, in the scenario in which the source access network device determines to hand over the terminal device to the target access network device, the load of the target access network device increases because of excessively frequent QoE measurements. Therefore, when the load of the target access network device is high, the target access network device receives first indication information from the source access network device to determine the QoE measurement that has been started by the terminal device, and then indicates the terminal device to pause or cancel the at least one QoE measurement other than the QoE measurement that has been started, to reduce the load of the target access network device and improve communication efficiency.

Figure 4:
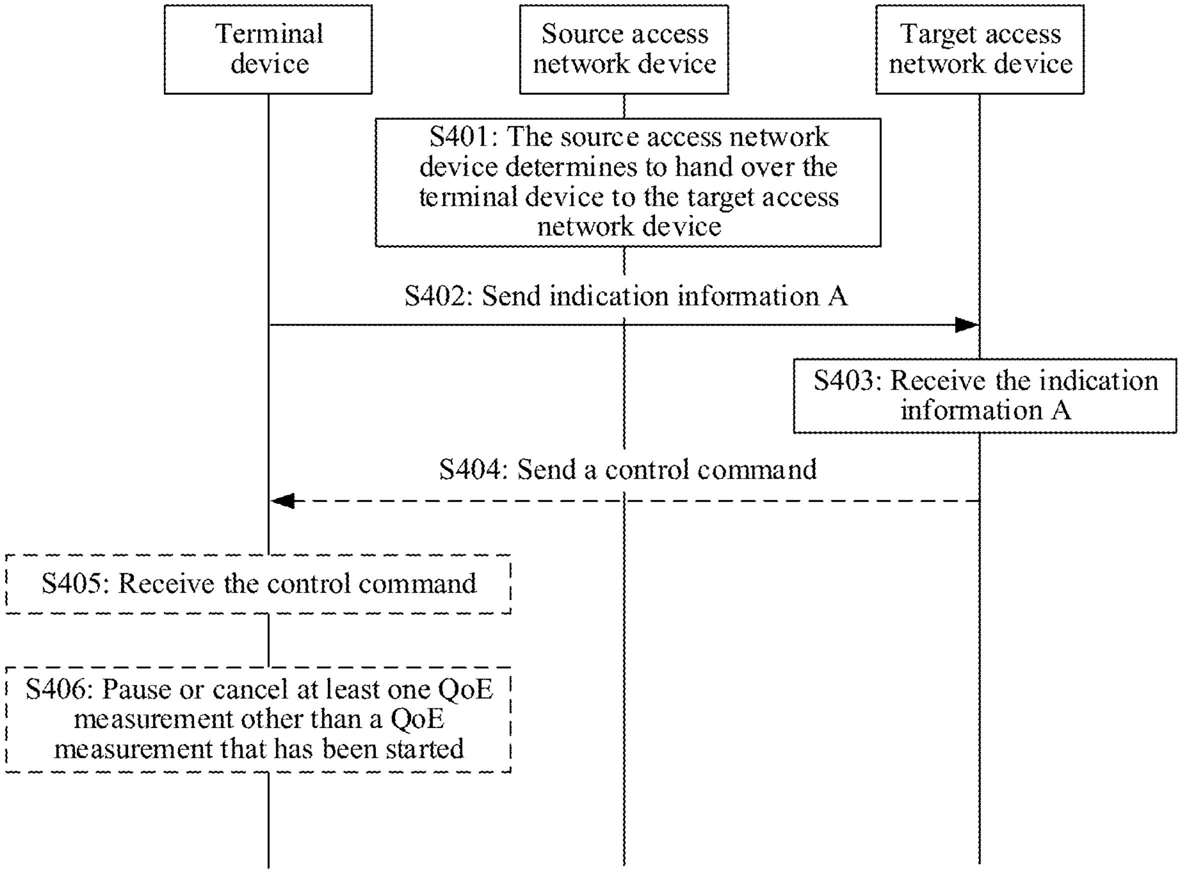
FIG. 4 is a flowchart of another method for a QoE measurement according to an embodiment of this application.

FIG. 4 shows another method for QoE measurement according to an embodiment of this application. The method includes but is not limited to the following steps.

Step S401: A source access network device determines to hand over a terminal device to a target access network device.

Specifically, the source access network device and the target access network device may correspond to different access network devices in different scenarios. For details, refer to step S301. Details are not described herein again.

Step S402: The terminal device sends indication information A to the target access network device.

The indication information A indicates a QoE measurement that has been started by the terminal device. For the indication information A, refer to the indication information A in step S302. Details are not described herein again.

Specifically, when the terminal device is handed over from the source access network device to the target access network device, or after the terminal device is handed over from the source access network device to the target access network device, the terminal device sends the indication information A to the target access network device, where the indication information A indicates the QoE measurement that has been started by the terminal device, in other words, the QoE measurement that has been started by the terminal device includes a QoE measurement that has been started but has been ended and/or a measurement that has been started and is being executed. Alternatively, the indication information A indicates a QoE measurement that has been started by the terminal device and is being executed, that is, does not include a QoE measurement that has been started but has been ended.

Specifically, the indication information A may be a QoE measurement list. For details, refer to descriptions of step S302. Details are not described herein again.

Specifically, that the terminal device sends the indication information A to the target access network device may mean that an upper layer of an AS of the terminal device sends the indication information A to the AS of the terminal device, and after receiving the indication information A, the AS of the terminal device sends the indication information A to the target access network device.

In a possible implementation, the AS of the terminal device receives indication information E (for example, the target access network device or the source access network device sends the indication information E to the terminal device). The indication information E indicates that the terminal device is handed over from the source access network device to the target access network device (for example, the indication information E indicates that base station handover occurs), or indicates that the terminal device needs to report the indication information A or requests the terminal device to report the indication information A. Then, before the terminal device sends the indication information A to the target access network device, the AS of the terminal device sends indication information F to the upper layer of the AS of the terminal device, where the indication information F indicates that the terminal device is handed over from the source access network device to the target access network device (for example, the indication information F indicates that base station handover occurs) or indicates that the terminal device needs to report the indication information A.

Step S403: The target access network device receives the indication information A from the terminal device.

Specifically, the indication information A indicates the QoE measurement that has been started by the terminal device.

In a possible implementation, when the indication information A includes a session recording indication, the method further includes: The target access network device receives indication information B from the source access network device.

Specifically, the indication information B indicates that a QoE measurement for a session corresponding to the session recording indication is in a started and executing state, a started and stopped state, or a started and completed state. For details, refer to descriptions of step S303. Details are not described herein again.

In a possible implementation, when the indication information A includes a session recording indication, the method further includes: The target access network device receives indication information C or indication information D from the source access network device.

Specifically, the indication information C indicates that a QoE measurement for a session corresponding to the session recording indication is in a started and executing state, and the indication information D indicates that a QoE measurement for the session corresponding to the session recording indication is in a started and stopped state or a started and completed state. For details, refer to descriptions of step S303. Details are not described herein again.

For step S404 to step S406, refer to step S304 to step S306. Details are not described herein again.

In the foregoing method, in the scenario in which the source access network device determines to hand over the terminal device to the target access network device, load of the target access network device is increased because of excessively frequent QoE measurements. Therefore, when the load of the target access network device is high, the target access network device receives first indication information from the terminal device determine the QoE measurement that has been started by the terminal device, and then indicates the terminal device to pause or cancel at least one QoE measurement other than the QoE measurement that has been started, to reduce the load of the target access network device and improve communication efficiency.

Figure 5:
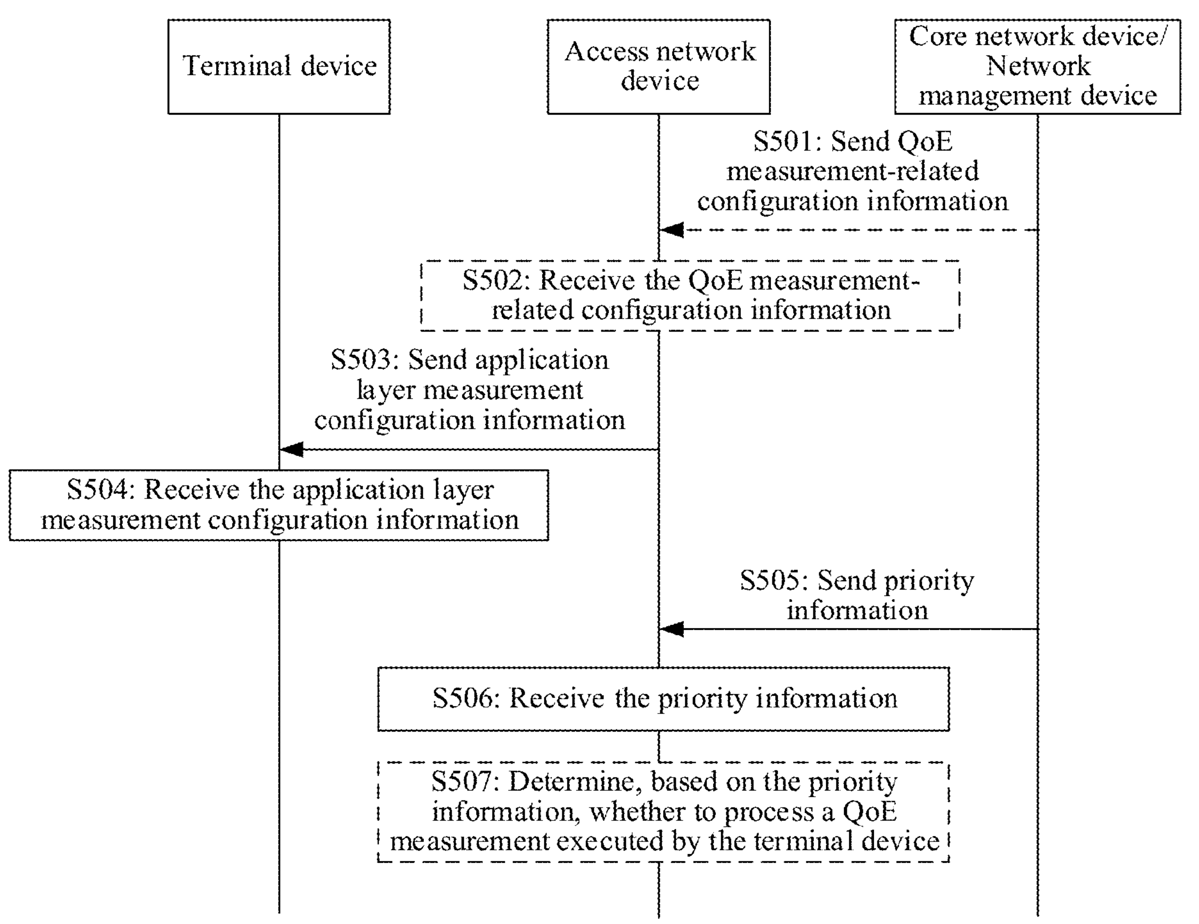
FIG. 5 is a flowchart of still another method for a QoE measurement according to an embodiment of this application.

FIG. 5 shows still another method for a QoE measurement according to an embodiment of this application. The method includes but is not limited to the following steps.

Step S501: A network management device sends QoE measurement-related configuration information to an access network device.

Specifically, step S501 is an optional step, and the network management device may be a core network device or OAM. The QoE measurement-related configuration information includes application layer measurement configuration information. The QoE measurement-related configuration information includes a container, and the container includes the application layer measurement configuration information.

Step S502: The access network device receives the QoE measurement-related configuration information from the network management device.

Specifically, step S502 is an optional step.

Step S503: The access network device sends the application layer measurement configuration information to a terminal device.

Specifically, the access network device sends the application layer measurement configuration information to an AS of the terminal device. After receiving the application layer measurement configuration information, the AS of the terminal device sends the application layer measurement configuration information to an upper layer of the AS of the terminal device. The application layer measurement configuration information is used by the upper layer of the AS of the terminal device to determine a measurement result of a QoE measurement.

Step S504: The terminal device receives the application layer measurement configuration information from the access network device.

Step S505: The network management device sends priority information to the access network device.

Specifically, the network management device may be OAM, and the priority information indicates a priority of at least one QoE measurement. The priority information may include at least one of the following: priority information of a QoE measurement corresponding to a service type, priority information of a QoE measurement corresponding to a network slice, and priority information of a QoE measurement corresponding to the terminal device. A priority may be measured in different values, and different values represent different priorities. For example, a smaller value indicates a higher priority. For example, in an example, the priority information includes priority information of a service type. For example, a priority of a QoE measurement corresponding to an MTSI service is 1, a priority of a QoE measurement corresponding to a VR service is 2. The priority of the QoE measurement corresponding to the MTSI service is higher than the priority of the QoE measurement corresponding to the VR service.

Step S506: The access network device receives the priority information from the network management device.

Specifically, the priority information indicates a priority of at least one QoE measurement.

Optionally, in a scenario in which the terminal device is handed over from a source access network device to a target access network device, the source access network device sends the priority information to the target access network device. In other words, when the access network device is the source access network device, after receiving the priority information from the network management device, the access network device sends the priority information to the target access network device. When being the target access network device, the access network device receives the priority information from the source access network device.

It should be noted that when step S501 to step S502 are performed, there is no strict sequence between steps S505-S506 and steps S501-S502.

S507: The access network device determines, based on the priority information, whether to process the QoE measurement executed by the terminal device.

Specifically, step S507 is an optional step. When determining to process the QoE measurement executed by the terminal device, the access network device may send a control command to the terminal device, where the control command indicates the terminal device to pause or cancel the QoE measurement.

In an example, it is assumed that the priority information is that a priority of a QoE measurement corresponding to an MTSI service is 1, a priority of a QoE measurement corresponding to a VR service is 2, the priority of the QoE measurement corresponding to the MTSI service is higher than the priority of the QoE measurement corresponding to the VR service, and the QoE measurement executed by the terminal device includes the QoE measurement corresponding to the MTSI service and the QoE measurement corresponding to the VR service. When load of the access network device is high, the access network device determines to process the QoE measurement executed by the terminal device. Because the priority of the QoE measurement corresponding to the MTSI service is higher than the priority of the QoE measurement corresponding to the VR service, the access network device sends a control command to the terminal device, where the control command indicates the terminal device to pause the QoE measurement corresponding to the VR service.

In an example, it is assumed that the priority information is that a priority of a QoE measurement corresponding to an MTSI service is 1, a priority of a QoE measurement corresponding to a VR service is 2, the priority of the QoE measurement corresponding to the MTSI service is higher than the priority of the QoE measurement corresponding to the VR service, a terminal device 1 executes the QoE measurement corresponding to the MTSI service, and a terminal device 2 executes the QoE measurement corresponding to the VR service. When load of the access network device is high, the access network device determines to process the QoE measurement executed by the terminal device. Because the priority of the QoE measurement corresponding to the MTSI service is higher than the priority of the QoE measurement corresponding to the VR service, the access network device sends a control command to the terminal device 2, where the control command indicates the terminal device 2 to pause the QoE measurement corresponding to the VR service.

It should be noted that the embodiment in FIG. 5 may be combined with the embodiment in FIG. 3 or FIG. 4, for example, step S301 to step S303 and step S505 to step S507 may be combined.

In the foregoing method, the target access network device obtains the priority information, and determines, based on the priority information, whether to process the QoE measurement, so that a specific requirement of an operator can be met. For example, the operator pays more attention to a QoE measurement for a service, so that the target access network device may indicate the terminal device to cancel or pause a QoE measurement other than the QoE measurement for the service that the operator pays more attention to.

Figure 6:
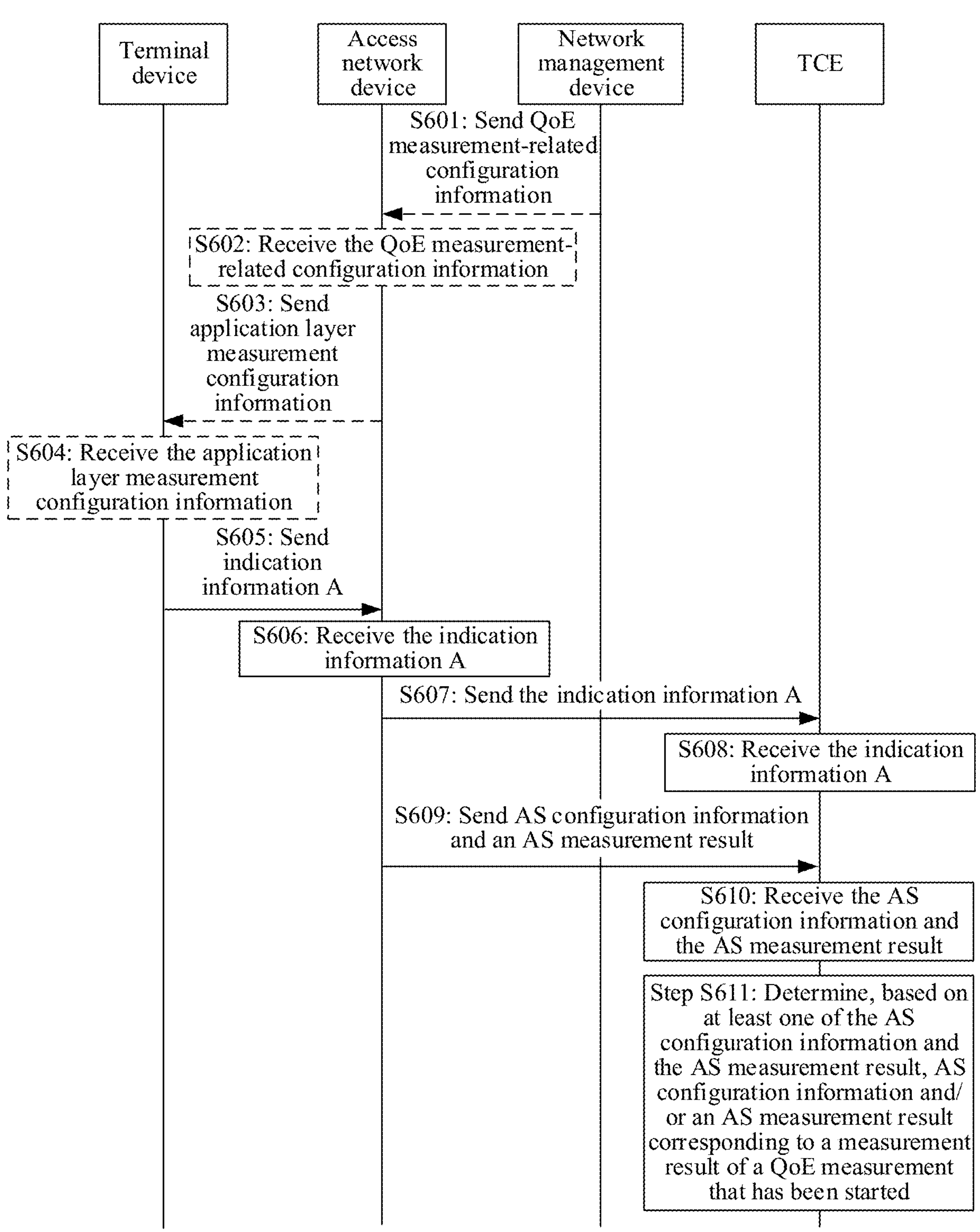
FIG. 6 is a flowchart of still another method for a QoE measurement according to an embodiment of this application.

FIG. 6 shows still another method for a QoE measurement according to an embodiment of this application. The method includes but is not limited to the following steps.

For step S601 to step S604, refer to step S501 to step S504. Details are not described herein again.

Specifically, step S601 to step S604 are optional steps.

Step S605: A terminal device sends indication information A to an access network device.

Specifically, the indication information A indicates a QoE measurement that has been started by the terminal device, and the indication information A may be a QoE measurement list. For details, refer to descriptions of step S302. Details are not described herein again. That the terminal device sends the indication information A to the access network device may mean that an upper layer of an AS of the terminal device sends the indication information A to the AS of the terminal device, and the AS of the terminal device sends the indication information A to the access network device.

In a possible implementation, after the terminal device sends the indication information A to the access network device, and after a QoE measurement for a first session ends, the terminal device sends indication information B or indication information D to the access network device. The indication information B indicates that the QoE measurement for the first session is in a stopped state or a completed state, and the indication information D indicates that the QoE measurement for the first session is stopped or has been completed.

Step S606: The access network device receives the indication information A from the terminal device.

Step S607: The access network device sends the indication information A to a TCE.

Step S608: The TCE receives the indication information A from the access network device.

Step S609: The access network device sends at least one of AS configuration information and an AS measurement result to the TCE.

It should be noted that in this embodiment, the access network device sends the at least one of the AS configuration information and the AS measurement result to the TCE only after receiving the indication information A from the terminal device.

Specifically, the AS configuration information may be wireless configuration information. For example, the access network device configures CA, DC, or the like for the terminal device, for the TCE to determine a wireless configuration corresponding to a measurement result of a QoE measurement. For example, the TCE may determine that the QoE measurement is a measurement result that is of the QoE measurement and that is obtained when the CA or the DC is configured or not configured. The AS measurement result may be a measurement result obtained through an L2 measurement or an MDT measurement. The AS measurement result may be an AS indicator or a comprehensive score of the AS indicator. For details, refer to an application layer indicator. Details are not described herein again.

Optionally, in a scenario in which the terminal device is handed over from a source access network device to a target access network device, after receiving the indication information A from the source access network device or the terminal device, the target access network device sends the at least one of the AS configuration information and the AS measurement result to the TCE. In other words, when the access network device is the target access network device, after receiving the indication information A from the source access network device or the terminal device, the access network device sends the at least one of the AS configuration information and the AS measurement result to the TCE.

Step S610: The TCE receives the at least one of the AS configuration information and the AS measurement result from the access network device.

Step S611: The TCE determines, based on the at least one of the AS configuration information and the AS measurement result, AS configuration information and/or an AS measurement result corresponding to a measurement result of the QoE measurement that has been started.

Specifically, the AS configuration information and/or the AS measurement result are/is used by the TCE to analyze the measurement result of the QoE measurement, to optimize some configurations of the access network device. A specific analysis process may be as follows. In an example, it is assumed that the measurement result of the QoE measurement is poor and the AS measurement result is also poor. In this case, the TCE may determine, by viewing the AS measurement result, that the AS measurement result is poor, to determine that the poor measurement result of the QoE measurement is caused by an AS side. In another example, it is assumed that the measurement result of the QoE measurement is poor and the AS measurement result is good. In this case, the TCE determines, by viewing the AS measurement result, that the AS measurement result is good, to determine that the poor measurement result of the QoE measurement is not caused by an AS side, but is caused by another reason. In other words, the TCE may associate the measurement result of the QoE measurement that has been started with corresponding AS configuration information and/or AS measurement result.

It should be noted that S609 to S611 may be an independent embodiment, and may be performed before the TCE receives the indication information A.

In the foregoing method, because the AS configuration information and the AS measurement result may change at any time, in a QoE scenario, after receiving first indication information from the terminal device, the target access network device sends the AS configuration information and the AS measurement result to the TCE. Only the AS configuration information and the AS measurement result that are sent after the first indication information is received can be used by the TCE to analyze the measurement result of the QoE measurement, thereby optimizing a configuration of the target access network device and improving communication efficiency.

Figure 7:
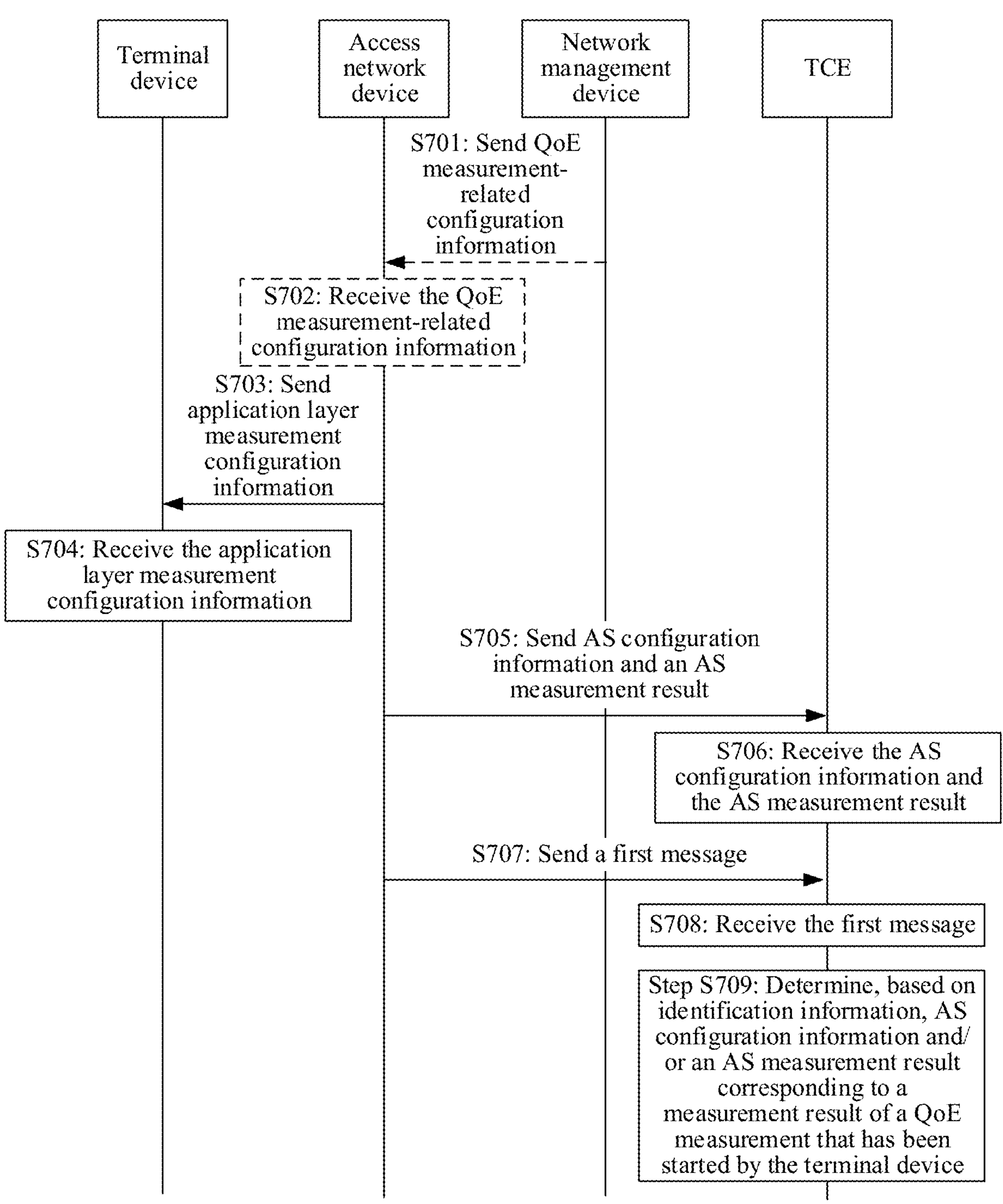
FIG. 7 is a flowchart of still another method for a QoE measurement according to an embodiment of this application.

FIG. 7 shows still another method for a QoE measurement according to an embodiment of this application. The method includes but is not limited to the following steps.

For step S701 to step S704, refer to step S601 to step S604. Details are not described herein again.

In a possible implementation, after a terminal device sends indication information A to an access network device, and after a QoE measurement for a first session ends, the terminal device sends indication information B or indication information D to the access network device. The indication information B indicates that the QoE measurement for the first session is in a stopped state or a completed state, and the indication information D indicates that the QoE measurement for the first session is stopped or has been completed.

Step S705: The access network device sends at least one of AS configuration information and an AS measurement result to a TCE.

Specifically, for the AS configuration information and the AS measurement result, refer to descriptions of step S609. Details are not described herein again. Optionally, in a scenario in which the terminal device is handed over from a source access network device to a target access network device, the target access network device sends the at least one of the AS configuration information and the AS measurement result to the TCE.

Step S706: The TCE receives the at least one of the AS configuration information and the AS measurement result from the access network device.

Step S707: The access network device sends a first message to the TCE.

Specifically, the first message includes the indication information A. The indication information A indicates a QoE measurement that has been started by the terminal device, and the indication information A may be a QoE measurement list. For details, refer to descriptions of step S302. Details are not described herein again. Optionally, in the scenario in which the terminal device is handed over from the source access network device to the target access network device, after receiving the indication information A from the source access network device or the terminal device, the target access network device sends the first message to the TCE.

Specifically, the first message includes identification information, and the identification information includes an identifier of the terminal device and/or moment information. The moment information indicates a moment at which the access network device receives the indication information A from the terminal device or a moment at which the access network device sends the first message to the TCE. The identifier of the terminal device may be a trace identifier (trace ID), a trace reference identifier (trace reference ID), an access network trace identifier, or the like. The trace identifier may be generated by network management or an operator, and may be a 3-byte character string. The trace reference identifier includes a PLMN and the trace identifier. The access network trace identifier includes the trace reference identifier and a trace recording session reference. For a signaling-based QoE measurement, the trace identifier, the trace reference identifier, or a RAN trace identifier is sent by a CN to the access network device. For a management-based QoE measurement, the trace identifier or the trace reference identifier is sent by OAM to the access network device, and the trace recording session reference is generated by the access network device.

Step S708: The TCE receives the first message of the access network device.

Step S709: The TCE determines, based on the identification information, AS configuration information and/or an AS measurement result corresponding to the measurement result of the QoE measurement that has been started by the terminal device.

Specifically, the TCE may select AS configuration information and/or an AS measurement result after the moment information as the AS configuration information and/or the AS measurement result corresponding to the measurement result of the QoE measurement that has been started by the terminal device. In other words, the TCE may select, as the AS configuration information and/or the measurement result corresponding to the measurement result of the QoE measurement, AS configuration information and/or an AS measurement result that are/is reported by the access network device after the moment at which the access network device receives the indication information A from the terminal device. Alternatively, the TCE may select, as the AS configuration information and/or the measurement result corresponding to the measurement result of the QoE measurement, AS configuration information and/or an AS measurement result that are/is reported by the access network device after the moment at which the access network device sends the first message to the TCE.

Specifically, the AS configuration information and/or the AS measurement result corresponding to the measurement result of the QoE measurement that has been started are/is used by the TCE to analyze the measurement result of the QoE measurement, to optimize some configurations of the access network device. For a specific analysis process, refer to descriptions of step S611. Details are not described herein again.

It should be noted that, S705 and S706 may be an independent embodiment, and may be performed after the access network device sends the first message to the TCE.

In the foregoing method, because the AS configuration information and the AS measurement result may change at any time, in a QoE scenario, after sending the AS configuration information and the AS measurement result to the TCE, the target access network device sends the first indication information to the TCE. The identification information included in the first indication information includes the moment information, and the moment information is used by the TCE to select corresponding AS configuration information and AS measurement result, in other words, the AS configuration information and the AS measurement result that are after the moment information may be selected for the TCE to analyze the measurement result of the QoE measurement, to optimize a configuration of the target access network device and improve communication efficiency.

Figure 8:
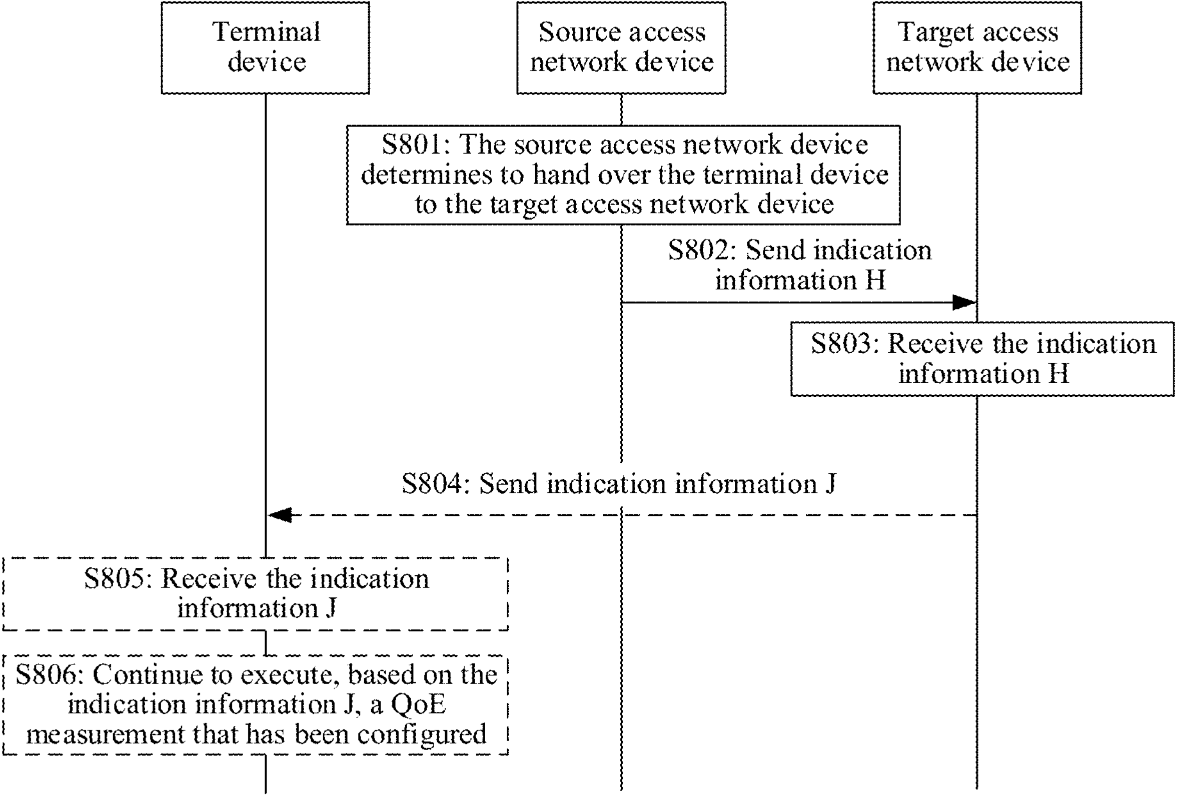
FIG. 8 is a flowchart of still another method for a QoE measurement according to an embodiment of this application.

FIG. 8 shows still another method for a QoE measurement according to an embodiment of this application. The method includes but is not limited to the following steps.

Step S801: A source access network device determines to hand over a terminal device to a target access network device.

Specifically, the source access network device and the target access network device correspond to different systems or belong to different RATs. In an example, the source access network device belongs to a 4G base station, and the target access network belongs to a 5G base station.

It should be noted that this step does not mean that the terminal device has been handed over to the target access network device, but means that the source access network device intends to hand over the terminal device to the target access network device.

Step S802: The source access network device sends indication information H to the target access network device.

Specifically, the indication information H indicates a QoE measurement that has been configured for the terminal device. In addition to sending the indication information H to the target access network device, the source access network device may further send indication information I, to indicate a service type corresponding to the QoE measurement that has been configured for the terminal device and a network slice corresponding to the QoE measurement that has been configured for the terminal device, and may further send configuration information corresponding to the QoE measurement that has been configured for the terminal device.

Specifically, the source access network device may send the indication information H or the indication information I to the target access network device in two manners. In a first manner, the source access network device may directly send the indication information H or the indication information I to the target access network device. In a second manner, the source access network device first sends the indication information H or the indication information I, for example, in a handover required message, to a core network device, and then the core network device sends the indication information H or the indication information I, for example, in a handover request message, to the target access network device.

In a possible implementation, the indication information H indicates that no QoE measurement is configured for the terminal device.

Step S803: The target access network device receives the indication information H from the source access network device.

Specifically, the indication information H indicates the QoE measurement that has been configured for the terminal device. In addition to determining, by receiving the indication information H from the source access network device, that the QoE measurement has been configured for the terminal device, the target access network device may indirectly determine, by receiving indication information A from the source access network device, that the QoE measurement has been configured for the terminal device. Further, the target access network device may further receive the indication information I from the source access network device, to indicate a service type corresponding to the QoE measurement that has been configured for the terminal device and a network slice corresponding to the QoE measurement that has been configured for the terminal device, and may further receive, from the source access network device, the configuration information of the QoE measurement that has been configured for the terminal device.

In a possible implementation, the indication information H indicates that no QoE measurement is configured for the terminal device.

Step S804: The target access network device sends indication information J to the terminal device.

Specifically, step S804 is an optional step. The indication information J indicates the terminal device to continue to execute the QoE measurement that has been configured for the terminal device. Further, the indication information J indicates the terminal device to continue to execute a first QoE measurement, where the first QoE measurement is at least one of QoE measurements that have been configured for the terminal device. For example, the target access network device sends indication information K to the terminal device, to indicate the terminal device to continue a QoE measurement corresponding to a specific service type (where for example, the indication information K carries a service type) and a QoE measurement corresponding to a specific network slice (where for example, the indication information K carries a network handover identifier).

In a possible implementation, the indication information J may alternatively indicate the terminal device to cancel or pause or stop the QoE measurement that has been configured. Further, the indication information J indicates the terminal device to cancel or pause or stop a first QoE measurement, where the first QoE measurement is at least one of QoE measurements that have been configured for the terminal device. For example, the target access network device sends indication information K to the terminal device, to indicate the terminal device to cancel or pause or stop a QoE measurement corresponding to a specific service type (where for example, the indication information K carries a service type) and a QoE measurement corresponding to a specific network slice (where for example, the indication information K carries a network handover identifier).

Step S805: The terminal device receives the indication information J from the target access network device.

Specifically, step S805 is an optional step. The indication information J indicates the terminal device to continue to execute the QoE measurement that has been configured for the terminal device. Further, the indication information J indicates the terminal device to continue to execute a first QoE measurement, where the first QoE measurement is at least one of QoE measurements that have been configured for the terminal device. In an example, it is assumed that the QoE measurements that have been configured for the terminal device include Measurement 7, Measurement 8, and Measurement 9. The terminal device receives the indication information J from the target access network device. The indication information J indicates the terminal device to continue the QoE measurements that have been configured for the terminal device, that is, Measurement 7, Measurement 8, and Measurement 9, or the indication information J indicates the terminal device to continue to execute Measurement 9. In an example, the terminal device receives the indication information K from the target access network device, and determines, based on the indication information K, which measurement is the first QoE measurement.

Specifically, that the terminal device receives the indication information J from the target access network device may mean that an AS of the terminal device receives the indication information J from the target access network device. After receiving the indication information J from the target access network device, the AS of the terminal device sends the indication information J to an upper layer of the AS of the terminal device. In an example, the AS of the terminal device sends the indication information K to the upper layer of the AS of the terminal device.

In a possible implementation, the indication information J may indicate the terminal device to cancel or pause or stop the QoE measurement that has been configured. Further, the indication information J indicates the terminal device to cancel or pause or stop a first QoE measurement, where the first QoE measurement is at least one of QoE measurements that have been configured for the terminal device. In an example, it is assumed that the QoE measurements that have been configured for the terminal device include Measurement 7, Measurement 8, and Measurement 9. The terminal device receives the indication information J from the target access network device. The indication information J indicates the terminal device to cancel or pause or stop the QoE measurements that have been configured for the terminal device, that is, Measurement 7, Measurement 8, and Measurement 9, or the indication information J indicates the terminal device to cancel or pause or stop executing Measurement 9. In an example, the terminal device receives the indication information K from the target access network device, and determines, based on the indication information K, which measurement is the first QoE measurement.

Specifically, that the terminal device receives the indication information J from the target access network device may mean that an AS of the terminal device receives the indication information J from the target access network device. After receiving the indication information J from the target access network device, the AS of the terminal device sends the indication information J to an upper layer of the AS of the terminal device. In an example, the AS of the terminal device sends the indication information K to the upper layer of the AS of the terminal device.

Step S806: The terminal device continues to execute or cancel or pause or stop, based on the indication information J and/or the indication information K, the QoE measurement that has been configured for the terminal device.

Step S806 is an optional step.

The embodiment in FIG. 8 may be combined with any one of the embodiments shown in FIG. 3 to FIG. 7, for example, step S301 to step S303 and step S801 to step S806 may be combined.

In the foregoing method, because excessively frequent QoE measurements may increase load of the access network device and affect communication efficiency, the target access network device determines, by receiving the indication information H from the source access network device, that the QoE measurement has been configured for the terminal device, so that the target access network device can process the QoE measurement, for example, continue to execute, pause, or cancel the QoE measurement, to properly schedule resources.

Figure 9:
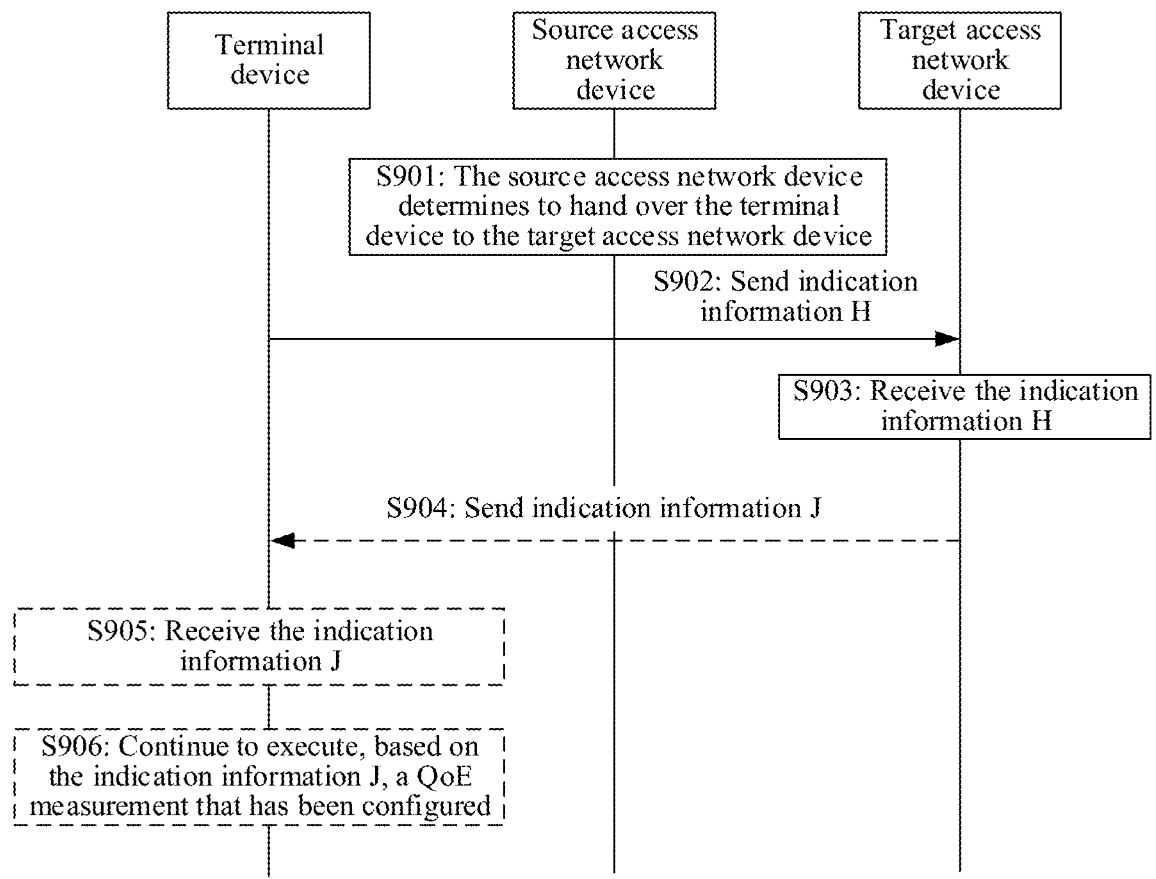
FIG. 9 is a flowchart of still another method for a QoE measurement according to an embodiment of this application.

FIG. 9 shows still another method for a QoE measurement according to an embodiment of this application. The method includes but is not limited to the following steps.

Step S901: A source access network device determines to hand over a terminal device to a target access network device.

Specifically, the source access network device and the target access network device correspond to different systems or belong to different RATs. In an example, the source access network device belongs to a 4G base station, and the target access network belongs to a 5G base station.

It should be noted that this step does not mean that the terminal device has been handed over to the target access network device, but means that the source access network device intends to hand over the terminal device to the target access network device.

Step S902: The terminal device sends indication information H to the target access network device.

Specifically, the indication information H indicates a QoE measurement that has been configured for the terminal device.

Specifically, for the indication information H, refer to the indication information H in step S802. Details are not described herein again. In addition to sending the indication information H to the target access network device, the terminal device may further send indication information I, to indicate a service type corresponding to the QoE measurement that has been configured for the terminal device and a network slice corresponding to the QoE measurement that has been configured for the terminal device, and may further send configuration information corresponding to the QoE measurement that has been configured for the terminal device.

Optionally, the terminal device may report the indication information H only after receiving a request indication sent by the target access network device, or the terminal device may actively send the indication information H after receiving a handover command.

In a possible implementation, the indication information H indicates that no QoE measurement is configured for the terminal device.

Step S903: The target access network device receives the indication information H from the terminal device.

Specifically, the indication information H indicates the QoE measurement that has been configured for the terminal device. In addition to determining, by receiving the indication information H from the terminal device, that the QoE measurement has been configured for the terminal device, the target access network device may indirectly determine, by receiving indication information A from the terminal device, that the QoE measurement has been configured for the terminal device. Further, the target access network device may further receive the indication information I from the terminal device, to indicate a service type corresponding to the QoE measurement that has been configured for the terminal device and a network slice corresponding to the QoE measurement that has been configured for the terminal device, and may further receive, from the terminal device, the configuration information of the QoE measurement that has been configured for the terminal device.

In a possible implementation, the indication information H indicates that no QoE measurement is configured for the terminal device.

For step S904 to step S906, refer to step S804 to step S806. Details are not described herein again.

The embodiment in FIG. 9 may be combined with any one of the embodiments shown in FIG. 3 to FIG. 7, for example, step S301 to step S303 and step S901 to step S906 may be combined.

In the foregoing method, because excessively frequent QoE measurements may increase load of the access network device and affect communication efficiency, the target access network device determines, by receiving the indication information H from the terminal device, that the QoE measurement has been configured for the terminal device, so that the target access network device can process the QoE measurement, for example, continue to execute, pause, or cancel the QoE measurement, to properly schedule resources.

It may be understood that, to implement functions in the foregoing embodiments, the target access network device, the source access network device, and the terminal device include corresponding hardware structures and/or software modules for performing the functions. A person skilled in the art should be easily aware that, in combination with the units and the method steps in the examples described in embodiments disclosed in this application, this application can be implemented by using hardware or a combination of hardware and computer software. Whether a function is performed by using hardware or hardware driven by computer software depends on a particular application scenario and design constraint of the technical solutions.

Figure 10:
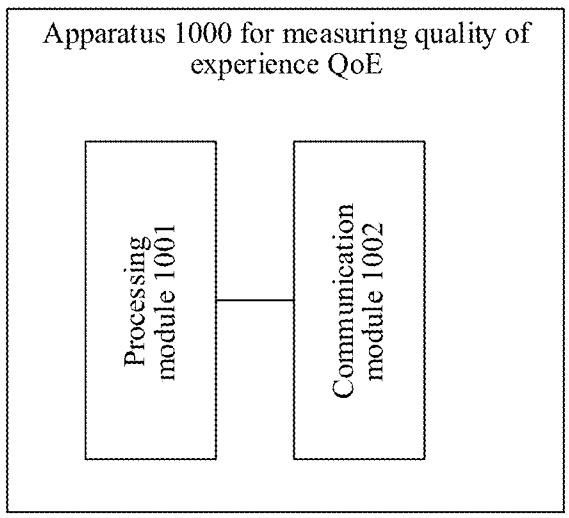
FIG. 10 is a schematic diagram of a structure of an apparatus for a QoE measurement according to an embodiment of this application.
Figure 11:
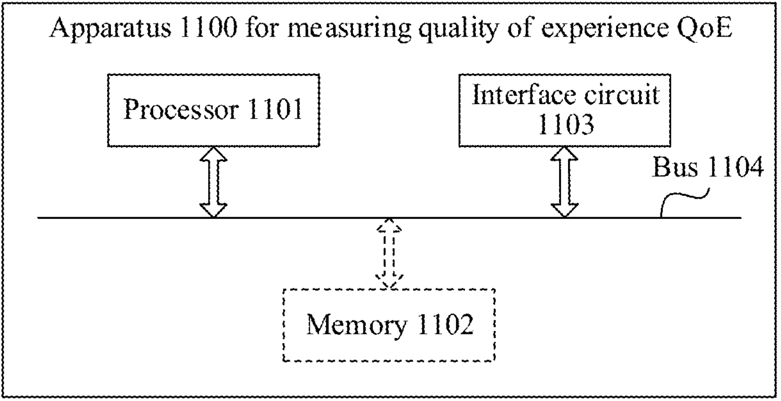
FIG. 11 is a schematic diagram of a structure of another apparatus for a QoE measurement according to an embodiment of this application.

FIG. 10 and FIG. 11 each are a schematic diagram of a structure of a possible apparatus for measuring quality of experience QoE according to an embodiment of this application. These apparatuses for the quality of experience QoE measurement may be configured to implement functions of the target access network device, the source access network device, the terminal device, the access network device, the network management device, or the TCE in the foregoing method embodiments, and therefore can also implement beneficial effects of the foregoing method embodiments.

As shown in FIG. 10, the apparatus 1000 for the quality of experience QoE measurement includes a processing module 1001 and a communication module 1002. The apparatus 1000 for the quality of experience QoE measurement is configured to implement functions of the target access network device in the method embodiment shown in FIG. 3, FIG. 4, FIG. 5, FIG. 6, FIG. 7, FIG. 8, or FIG. 9.

When the apparatus 1000 for the quality of experience QoE measurement is configured to implement the functions of the target access network device in the method embodiment shown in FIG. 3 or FIG. 4, the processing module 1001 is configured to determine that the terminal device is handed over from the source access network device to the target access network device; and the processing module 1001 is configured to obtain first indication information by using the communication module 1002, where the first indication information indicates a quality of experience QoE measurement that has been started by the terminal device.

In a possible implementation, the communication module 1002 is configured to send a first message to the terminal device based on the first indication information, where the first message indicates the terminal device to pause or cancel at least one QoE measurement other than the QoE measurement that has been started.

In another possible implementation, the communication module 1002 is configured to receive the first indication information from the source access network device.

In still another possible implementation, the communication module 1002 is configured to receive the first indication information from the terminal device.

In still another possible implementation, the first indication information includes at least one of the following: a service type corresponding to the QoE measurement that has been started by the terminal device, identification information of a network slice corresponding to the QoE measurement that has been started, and a session recording indication of the terminal device.

In still another possible implementation, when the first indication information includes the session recording indication, the communication module 1002 is further configured to obtain second indication information, where the second indication information indicates that a QoE measurement for a session corresponding to the session recording indication is in a started and executing state, a stopped state, or a completed state.

In still another possible implementation, when the first indication information includes the session recording indication, the communication module 1002 is further configured to obtain third indication information or fourth indication information, where the third indication information indicates that a QoE measurement for a session corresponding to the session recording indication is in a started and executing state, and the fourth indication information indicates that a QoE measurement for a session corresponding to the session recording indication is in a stopped state or a completed state.

In still another possible implementation, the second indication information, the third indication information, or the fourth indication information includes a service type corresponding to the session corresponding to the session recording indication.

In still another possible implementation, before receiving the first indication information from the terminal device, the communication module 1002 is further configured to send fifth indication information to an access stratum AS of the terminal device, where the fifth indication information indicates the terminal device to hand over to the target access network device.

In still another possible implementation, the first indication information indicates a QoE measurement that has been currently started and is being executed by the terminal device.

When the apparatus 1000 for the quality of experience QoE measurement is configured to implement functions of the source access network device in the method embodiment shown in FIG. 3 or FIG. 4, the processing module 1001 is configured to determine that the terminal device is handed over from the source access network device to the target access network device; and the communication module 1002 is configured to send first indication information to the target access network device, where the first indication information indicates a quality of experience QoE measurement that has been started by the terminal device.

In a possible implementation, the first indication information includes at least one of the following: a service type corresponding to the QoE measurement that has been started by the terminal device, identification information of a network slice corresponding to the QoE measurement that has been started, and a session recording indication of the terminal device.

In another possible implementation, when the first indication information includes the session recording indication, the communication module 1002 is further configured to send second indication information to the target access network device, where the second indication information indicates that a QoE measurement for a session corresponding to the session recording indication is in a started and executing state, a stopped state, or a completed state.

In still another possible implementation, when the first indication information includes the session recording indication, the communication module 1002 is further configured to send third indication information or fourth indication information to the target access network device, where the third indication information indicates that a QoE measurement for a session corresponding to the session recording indication is in a started and executing state, and the fourth indication information indicates that a QoE measurement for a session corresponding to the session recording indication is in a stopped state or a completed state.

In still another possible implementation, the second indication information, the third indication information, or the fourth indication information includes a service type corresponding to the session corresponding to the session recording indication.

When the apparatus 1000 for the quality of experience QoE measurement is configured to implement the functions of the terminal device in the method embodiment shown in FIG. 3 or FIG. 4, the processing module 1001 is configured to hand over from the source access network device to the target access network device, and the communication module 1002 is configured to send first indication information to the target access network device, where the first indication information indicates a quality of experience QoE measurement that has been started by the terminal device.

In a possible implementation, the communication module 1002 is further configured to receive a first message from the target access network device, where the first message indicates to pause or cancel at least one QoE measurement other than the QoE measurement that has been started.

In another possible implementation, the communication module 1002 is further configured to receive fifth indication information from the target access network device, where the fifth indication information indicates the terminal device to hand over to the target access network device.

In still another possible implementation, before sending the first indication information to the target access network device, the communication module 1002 is further configured to send the fifth indication information to an upper layer of an AS of the terminal device.

In still another possible implementation, the first indication information indicates a QoE measurement that has been currently started and is being executed by the terminal device.

In still another possible implementation, the communication module 1002 is further configured to receive the first indication information from the upper layer of the AS of the terminal device.

In still another possible implementation, the first indication information includes at least one of the following: a service type corresponding to the QoE measurement that has been started by the terminal device, identification information of a network slice corresponding to the QoE measurement that has been started, and a session recording indication of the terminal device.

In still another possible implementation, when the first indication information includes the session recording indication, the communication module 1002 is further configured to send second indication information to the source access network device, where the second indication information indicates that a QoE measurement for a session corresponding to the session recording indication is in a started and executing state, a stopped state, or a completed state.

In still another possible implementation, when the first indication information includes the session recording indication, the communication module 1002 is further configured to send third indication information or fourth indication information to the source access network device, where the third indication information indicates that a QoE measurement for a session corresponding to the session recording indication is in a started and executing state, and the fourth indication information indicates that a QoE measurement for a session corresponding to the session recording indication is in a stopped state or a completed state.

It should be noted that, for implementations and beneficial effects of the modules, refer to corresponding descriptions in the method embodiment shown in FIG. 3 or FIG. 4.

When the apparatus 1000 for the quality of experience QoE measurement is configured to implement the functions of the access network device in the method embodiment shown in FIG. 5, the communication module 1002 is configured to receive priority information from a network management device, where the priority information indicates a priority of at least one quality of experience QoE measurement; and the processing module 1001 is configured to determine, based on the priority information, whether to process a QoE measurement executed by the terminal device.

In a possible implementation, when determining to process the QoE measurement executed by the terminal device, the processing module 1001 is further configured to send indication information to the terminal device by using the communication module 1002, where the indication information indicates the terminal device to pause or cancel the QoE measurement.

In another possible implementation, the priority information includes at least one of the following: priority information of a service type, priority information of a network slice, and priority information of the terminal device.

When the apparatus 1000 for the quality of experience QoE measurement is configured to implement the functions of the network management device in the method embodiment shown in FIG. 5, the processing module 1001 is configured to determine priority information. The communication module 1002 is configured to send the priority information to an access network device, where the priority information indicates a priority of at least one quality of experience QoE measurement, and the priority information is used by the access network device to determine whether to process a QoE measurement executed by the terminal device.

In a possible implementation, the priority information includes at least one of the following: priority information of a service type, priority information of a network slice, and priority information of the terminal device.

It should be noted that, for implementations and beneficial effects of the modules, refer to corresponding descriptions in the method embodiment shown in FIG. 5.

When the apparatus 1000 for the quality of experience QoE measurement is configured to implement the functions of the access network device in the method embodiment shown in FIG. 6, the processing module 1001 is configured to receive first indication information from the terminal device by using the communication module 1002, where the first indication information indicates a quality of experience QoE measurement that has been started by the terminal device. The communication module 1002 is configured to send at least one of access stratum AS configuration information and an AS measurement result to a trace collection entity TCE, where the at least one of the AS configuration information and the AS measurement result is used by the TCE to determine AS configuration information and/or an AS measurement result corresponding to a measurement result of the QoE measurement that has been started by the terminal device.

In a possible implementation, the communication module 1002 is further configured to send the first indication information to the TCE.

In another possible implementation, before sending the first indication information to the TCE, the communication module 1002 is further configured to receive second indication information from the terminal device, where the second indication information indicates that a QoE measurement corresponding to a first session is in a stopped state or a completed state.

In still another possible implementation, the communication module 1002 is further configured to send the second indication information to the TCE.

When the apparatus 1000 for the quality of experience QoE measurement is configured to implement the functions of the TCE in the method embodiment shown in FIG. 6, the processing module 1001 is configured to receive first indication information from the access network device by using the communication module 1002, where the first indication information indicates a quality of experience QoE measurement that has been started by the terminal device. The communication module 1002 is configured to receive at least one of access stratum AS configuration information and an AS measurement result from the access network device, and the TCE determines, based on the at least one of the AS configuration information and the AS measurement result, AS configuration information and/or an AS measurement result corresponding to a measurement result of the QoE measurement that has been started.

In a possible implementation, the communication module 1002 is further configured to receive second indication information from the access network device, where the second indication information indicates that a QoE measurement corresponding to a first session is in a stopped state or a completed state.

It should be noted that, for implementations and beneficial effects of the modules, refer to corresponding descriptions in the method embodiment shown in FIG. 6.

When the apparatus 1000 for the quality of experience QoE measurement is configured to implement the functions of the access network device in the method embodiment shown in FIG. 7, the processing module 1001 is configured to send access stratum AS configuration information and/or an AS measurement result to a trace collection entity TCE by using the communication module 1002. The communication module 1002 is further configured to send a first message to the TCE, where the first message includes first indication information, the first indication information indicates a quality of experience QoE measurement that has been started by the terminal device, the first message includes identification information, and the identification information is used to determine AS configuration information and/or an AS measurement result corresponding to a measurement result of the QoE measurement that has been started by the terminal device.

In a possible implementation, before sending the first message to the TCE, the communication module 1002 is further configured to receive the first indication information from the terminal device.

In another possible implementation, the identification information includes an identifier of the terminal device and/or moment information. The moment information indicates a moment at which the apparatus receives the first indication information from the terminal device.

In still another possible implementation, before sending the first message to the TCE, the communication module 1002 is further configured to receive second indication information from the terminal device, where the second indication information indicates that a QoE measurement corresponding to a first session is in a stopped state or a completed state.

When the apparatus 1000 for the quality of experience QoE measurement is configured to implement the functions of the TCE in the method embodiment shown in FIG. 7, the processing module 1001 is configured to receive access stratum AS configuration information and/or an AS measurement result from the access network device by using the communication module 1002. The communication module 1002 is further configured to receive a first message from the access network device, where the first message includes first indication information, the first indication information indicates a quality of experience QoE measurement that has been started by the terminal device, the first message includes identification information, and the identification information is used to determine AS configuration information and/or an AS measurement result corresponding to a measurement result of the QoE measurement that has been started by the terminal device.

In a possible implementation, the identification information includes an identifier of the terminal device and/or moment information. The moment information indicates a moment at which the access network device receives the first indication information from the terminal device.

It should be noted that, for implementations and beneficial effects of the modules, refer to corresponding descriptions in the method embodiment shown in FIG. 7.

When the apparatus 1000 for the quality of experience QoE measurement is configured to implement the functions of the target access network device in the method embodiment shown in FIG. 8 or FIG. 9, the processing module 1001 is configured to obtain first indication information, where the first indication information indicates a QoE measurement that has been configured for the terminal device. The communication module 1002 is configured to send second indication information to the terminal device, where the second indication information indicates the terminal device to continue to execute, cancel, pause, or stop the QoE measurement that has been configured.

In an optional manner, the communication module 1002 is configured to receive the first indication information from the source access network device.

In another optional manner, the communication module 1002 is configured to receive the first indication information from the terminal device.

In an optional manner, the processing module 1001 is configured to obtain configuration information corresponding to the QoE measurement that has been configured.

In a possible implementation, the communication module 1002 is configured to receive, from the source access network device, the configuration information corresponding to the QoE measurement that has been configured.

In a possible implementation, the communication module 1002 is configured to receive, from the terminal device, the configuration information corresponding to the QoE measurement that has been configured.

In still another optional manner, the second indication information indicates the terminal device to continue to execute a first QoE measurement, where the first QoE measurement is at least one of QoE measurements that have been configured for the terminal device.

In still another optional manner, the first indication information includes: a service type corresponding to the QoE measurement that has been configured for the terminal device.

When the apparatus 1000 for the quality of experience QoE measurement is configured to implement functions of the source access network device in the method embodiment shown in FIG. 8 or FIG. 9, the processing module 1001 is configured to determine that the terminal device is handed over from the apparatus to the target access network device; and the communication module 1002 is configured to send first indication information to the target access network device, where the first indication information indicates a QoE measurement that has been configured for the terminal device.

In a possible implementation, the communication module 1002 is configured to send, to the target access network device, configuration information corresponding to the QoE measurement that has been configured.

In another possible implementation, the first indication information includes: a service type corresponding to the QoE measurement that has been configured for the terminal device.

When the apparatus 1000 for the quality of experience QoE measurement is configured to implement functions of the terminal device in the method embodiment shown in FIG. 8 or FIG. 9, the processing module 1001 is configured to determine to hand over from the source access network device to the target access network device; and the communication module 1002 is configured to send first indication information to the target access network device, where the first indication information indicates a QoE measurement that has been configured for the apparatus.

In a possible implementation, the communication module 1002 is configured to receive second indication information from the target access network device, where the second indication information indicates the apparatus to continue to execute, cancel, pause, or stop the QoE measurement that has been configured.

In a possible implementation, the communication module 1002 is configured to send, to the target access network device, configuration information corresponding to the QoE measurement that has been configured.

In another optional manner, the second indication information indicates the apparatus to continue to execute a first QoE measurement, where the first QoE measurement is at least one of QoE measurements that have been configured for the apparatus.

In still another possible implementation, the first indication information includes: a service type corresponding to the QoE measurement that has been configured for the apparatus.

As shown in FIG. 11, the apparatus 1100 for the quality of experience QoE measurement includes a processor 1101 and an interface circuit 1103. The processor 1101 and the interface circuit 1103 are coupled to each other. It may be understood that the interface circuit 1103 may be a transceiver or an input/output interface. Optionally, the apparatus 1100 for the quality of experience QoE measurement may further include a memory 1102, configured to store instructions to be executed by the processor 1101, store input data required for running instructions by the processor 1101, or store data generated after the processor 1101 runs instructions.

When the apparatus 1100 for the quality of experience QoE measurement is configured to implement the method shown in FIG. 3, FIG. 4, FIG. 5, FIG. 6, FIG. 7, FIG. 8, or FIG. 9, the processor 1101 is configured to implement the function of the processing module 1001, and the interface circuit 1103 is configured to implement the function of the communication module 1002.

It may be understood that the processor in embodiments of this application may be a central processing unit (CPU), may be another general-purpose processor, a digital signal processor (DSP), an application-specific integrated circuit (ASIC), a field programmable gate array (FPGA), another programmable logic device, a transistor logic device, a hardware component, or any combination thereof. The general-purpose processor may be a microprocessor or any conventional processor or the like.

The method steps in embodiments of this application may be implemented in a hardware manner, or may be implemented in a manner of executing software instructions by the processor. The software instructions may include a corresponding software module. The software module may be stored in a random access memory, a flash memory, a read-only memory, a programmable read-only memory, an erasable programmable read-only memory, an electrically erasable programmable read-only memory, a register, a hard disk, a removable hard disk, a CD-ROM, or any other form of storage medium well-known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in a network device or a terminal device. Certainly, the processor and the storage medium may exist in the network device or the terminal device as discrete components.

All or some of the foregoing embodiments may be implemented by using software, hardware, firmware, or any combination thereof. When software is used to implement the embodiments, all or some of the embodiments may be implemented in a form of a computer program product. The computer program product includes one or more computer programs or instructions. When the computer programs or the instructions are loaded and executed on a computer, the procedures or the functions according to embodiments of this application are all or partially implemented. The computer may be a general-purpose computer, a dedicated computer, a computer network, a network device, user equipment, or another programmable apparatus. The computer programs or the instructions may be stored in a computer-readable storage medium, or may be transmitted from a computer-readable storage medium to another computer-readable storage medium. For example, the computer programs or the instructions may be transmitted from a website, computer, server, or data center to another website, computer, server, or data center in a wired or wireless manner. The computer-readable storage medium may be any usable medium accessible by the computer, or may be a data storage device, such as a server or a data center, integrating one or more usable media. The usable medium may be a magnetic medium, for example, a floppy disk, a hard disk, or a magnetic tape; or may be an optical medium, for example, a digital video disc; or may be a semiconductor medium, for example, a solid-state drive.

In embodiments of this application, unless otherwise stated or there is a logic conflict, terms and/or descriptions in different embodiments are consistent and may be mutually referenced, and technical features in different embodiments may be combined based on an internal logical relationship thereof, to form a new embodiment.

In this application, "at least one" means one or more, and "a plurality of" means two or more. The term "and/or" describes an association relationship for describing associated objects and represents that three relationships may exist. For example, A and/or B may represent the following cases: Only A exists, both A and B exist, and only B exists, where A and B may be singular or plural. In the text descriptions of this application, the character "/" generally indicates an "or" relationship between the associated objects. In a formula in this application, the character "/" indicates a "division" relationship between the associated objects.

It may be understood that various numbers in embodiments of this application are merely used for differentiation for ease of description, and are not used to limit the scope of embodiments of this application. The sequence numbers of the foregoing processes do not mean an execution sequence, and the execution sequences of the processes should be determined based on functions and internal logic of the processes.

What is claimed is:

1. A communication system, comprising:

a source access network device; and a target access network device;

wherein the source access network device is configured to:

determine that a terminal device is handed over from the source access network device to the target access network device; and send first indication information to the target access network device, wherein the first indication information indicates a quality of experience (QoE) measurement that has been started by the terminal device; and wherein the target access network device is configured to:

receive the first indication information from the source access network device;

receive priority information from a network management device, wherein the priority information indicates a priority of at least one QoE measurement;

determine, based on the priority information, whether to process the QoE measurement executed by the terminal device; and send a first message to the terminal device based on the priority information and the first indication information, wherein the first message indicates the terminal device to pause at least one QoE measurement other than the QoE measurement that has been started.

2. The communication system according to claim 1, wherein the first indication information comprises at least one of the following: a service type corresponding to the QoE measurement that has been started by the terminal device, or identification information of a network slice corresponding to the QoE measurement that has been started.

3. The communication system according to claim 1, wherein the target access network device is further configured to:

send second indication information to the terminal device based on determining to process the QoE measurement executed by the terminal device, wherein the second indication information indicates the terminal device to pause or cancel the QoE measurement executed by the terminal device.

4. The communication system according to claim 1, wherein the priority information comprises at least one of the following: priority information of a service type, priority information of a network slice, or priority information of the terminal device.

5. The communication system according to claim 1, wherein the target access network device is further configured to:

determine, based on the first indication information, that the QoE measurement has been configured for the terminal device.

6. The communication system according to claim 1, wherein the target access network device is further configured to:

send third indication information to the terminal device, wherein the third indication information indicates the terminal device to cancel or pause the QoE measurement.

7. The communication system according to claim 1, wherein the first indication information indicates a QoE measurement that has been currently started and is being executed by the terminal device.

8. A communication apparatus, wherein the communication apparatus comprises a target access network device, the communication apparatus comprising:

at least one memory; and at least one processor that executes program instructions stored in the at least one memory to enable the communication apparatus to perform operations comprising:

in a condition that a terminal device is determined to be handed over from a source access network device to the target access network device, receiving first indication information from the source access network device, wherein the first indication information indicates a quality of experience (QoE) measurement that has been started by the terminal device;

receiving priority information from a network management device, wherein the priority information indicates a priority of at least one QoE measurement;

determining, based on the priority information, whether to process the QoE measurement executed by the terminal device; and sending a first message to the terminal device based on the priority information and the first indication information, wherein the first message indicates the terminal device to pause at least one QoE measurement other than the QoE measurement that has been started.

9. The communication apparatus according to claim 8, wherein the first indication information comprises at least one of the following: a service type corresponding to the QoE measurement that has been started by the terminal device, or identification information of a network slice corresponding to the QoE measurement that has been started.

10. The communication apparatus according to claim 8, wherein the at least one memory further comprises instructions that, when executed by the at least one processor, cause the communication apparatus to perform operations comprising:

send second indication information to the terminal device based on determining to process the QoE measurement executed by the terminal device, wherein the second indication information indicates the terminal device to pause or cancel the QoE measurement executed by the terminal device.

11. The communication apparatus according to claim 10, wherein the priority information comprises at least one of the following: priority information of a service type, priority information of a network slice, or priority information of the terminal device.

12. The communication apparatus according to claim 8, wherein the at least one memory further comprises instructions that, when executed by the at least one processor, cause the communication apparatus to:

determine, based on the first indication information, that the QoE measurement has been configured for the terminal device.

13. The communication apparatus according to claim 8, wherein the at least one memory further comprises instructions that, when executed by the at least one processor, cause the communication apparatus to:

send third indication information to the terminal device, wherein the third indication information indicates the terminal device to cancel or pause the QoE measurement.

14. A communication apparatus, comprising:

at least one memory; and at least one processor that executes program instructions stored in the at least one memory to enable the communication apparatus to perform operations comprising:

determining that a terminal device is handed over from a source access network device to a target access network device; and sending first indication information to the target access network device, wherein the first indication information indicates a quality of experience (QoE) measurement that has been started by the terminal device, wherein priority information from a network management device is sent to the target access network device, wherein the priority information indicates a priority of at least one QoE measurement, and wherein the target network device determines, based on the priority information, whether to process the QoE measurement executed by the terminal device, and wherein the target network device sends a first message to the terminal device based on the priority information and the first indication information, wherein the first message indicates the terminal device to pause at least one QoE measurement other than the QoE measurement that has been started.

15. The communication apparatus according to claim 14, wherein the first indication information comprises at least one of the following: a service type corresponding to the QoE measurement that has been started by the terminal device, or identification information of a network slice corresponding to the QoE measurement that has been started.

16. The communication apparatus according to claim 14, wherein the first indication information indicates a QoE measurement that has been currently started and is being executed by the terminal device.

* * * * *